US009256647B2

(12) United States Patent
Umeda

(10) Patent No.: US 9,256,647 B2
(45) Date of Patent: Feb. 9, 2016

(54) APPARATUS AND METHOD FOR CONTROLLING DISPLAY OF A SEARCH RESULT AND RECORDING MEDIUM THEREFOR

(75) Inventor: Takashi Umeda, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 26 days.

(21) Appl. No.: 13/824,700

(22) PCT Filed: Aug. 31, 2012

(86) PCT No.: PCT/JP2012/072146
§ 371 (c)(1),
(2), (4) Date: Mar. 18, 2013

(87) PCT Pub. No.: WO2013/099354
PCT Pub. Date: Jul. 4, 2013

(65) Prior Publication Data
US 2013/0325854 A1 Dec. 5, 2013

(30) Foreign Application Priority Data
Dec. 28, 2011 (JP) ................................. 2011-290017

(51) Int. Cl.
G06F 17/30 (2006.01)
G06Q 30/06 (2012.01)

(52) U.S. Cl.
CPC ........ *G06F 17/3053* (2013.01); *G06Q 30/0601* (2013.01)

(58) Field of Classification Search
CPC ..................... G06Q 30/0601; G06Q 17/3053
See application file for complete search history.

(56) References Cited

U.S. PATENT DOCUMENTS

2004/0254676 A1* 12/2004 Blust et al. ..................... 700/231
2006/0190308 A1* 8/2006 Janssens et al. .................. 705/5

(Continued)

FOREIGN PATENT DOCUMENTS

JP 2008-146147 A 6/2008
JP 2010-140200 A 6/2010

OTHER PUBLICATIONS

Yamamoto, T., et al., "ContextRank: Word Base Feedback, and Re-ranking Method of Search Result based on its Context," First Forum about Data Engineering and Information Management-DEIM Forum Collected Papers, Japan, Committee of Experts of Data Engineering Research in the Institute of Electronic Information and Communication Engineerings, May 9, 2009, pp. 1-8.

*Primary Examiner* — Tarek Chbouki
(74) *Attorney, Agent, or Firm* — Sughrue Mion, PLLC

(57) ABSTRACT

An information processing apparatus allows a user to easily find information about search targets which the user is likely to desire. Pieces of information about a plurality of searched search targets displayed as a search result include attribute values of search targets. The information processing apparatus specifies information selected by the user from displayed information, and compares an attribute value of a selected search target, with attribute values of search targets associated with display rankings which are higher than a display ranking of the selected search target associated with the specified information. When the attribute value of the selected search target is more advantageous for the user, the information processing apparatus performs control such that information about search targets whose attribute values are more advantageous for the user than that of the selected search target changes to a display mode which is more easily visually checked than the information about search targets whose attribute values are more disadvantageous for the user than that of the selected search target.

8 Claims, 13 Drawing Sheets

(56) References Cited

U.S. PATENT DOCUMENTS

| | | | |
|---|---|---|---|
| 2006/0212362 A1* | 9/2006 | Donsbach et al. | 705/26 |
| 2007/0094056 A1* | 4/2007 | Kang et al. | 705/5 |
| 2008/0140577 A1* | 6/2008 | Rahman et al. | 705/71 |
| 2010/0169239 A1* | 7/2010 | Weng et al. | 705/400 |
| 2011/0252031 A1* | 10/2011 | Blumenthal et al. | 707/733 |
| 2012/0143883 A1* | 6/2012 | Chen et al. | 707/751 |

* cited by examiner

FIG.3

| | | |
|---|---|---|
| SEARCH RESULT OF XXXXX | | 210 |
| | 1 HIT TO 10 HITS (100 HITS IN TOTAL) ≥ | |

110
120
100-1 → □ PORTABLE GAME CONSOLE ABCDE BLUE/BLACK    15,000 YEN — 150
130 — SHOP: AAA    COMPARE □ — 140

100-2 → □ PORTABLE GAME CONSOLE ABCDE BLUE/BLACK    16,000 YEN
SHOP: BBB    COMPARE □

100-3 → □ PORTABLE GAME CONSOLE ABCDE BLUE/BLACK    14,000 YEN
SHOP: CCC    COMPARE □

100-4 → □ PORTABLE GAME CONSOLE ABCDE BLUE    15,000 YEN
SHOP: DDD    COMPARE □

100-5 → □ PORTABLE GAME CONSOLE ABCDE BLUE    13,000 YEN
SHOP: EEE    COMPARE □

100-6 → □ PORTABLE GAME CONSOLE ABCDE    14,000 YEN
SHOP: FFF    COMPARE □

100-7 → □ PORTABLE GAME CONSOLE ABCDE BLACK    12,000 YEN
SHOP: GGG    COMPARE □

100-8 → □ PORTABLE GAME CONSOLE ABCDE RED/BLACK    16,000 YEN
SHOP: HHH    COMPARE □

100-9 → □ PORTABLE GAME CONSOLE ABCDE BLUE    15,000 YEN
SHOP: III    COMPARE □

100-10 → □ PORTABLE GAME CONSOLE ABCDE BLUE/BLACK    11,000 YEN
SHOP: JJJ    COMPARE □

COMPARE — 300
1 HIT TO 10 HITS (100 HITS IN TOTAL) ≥ — 210

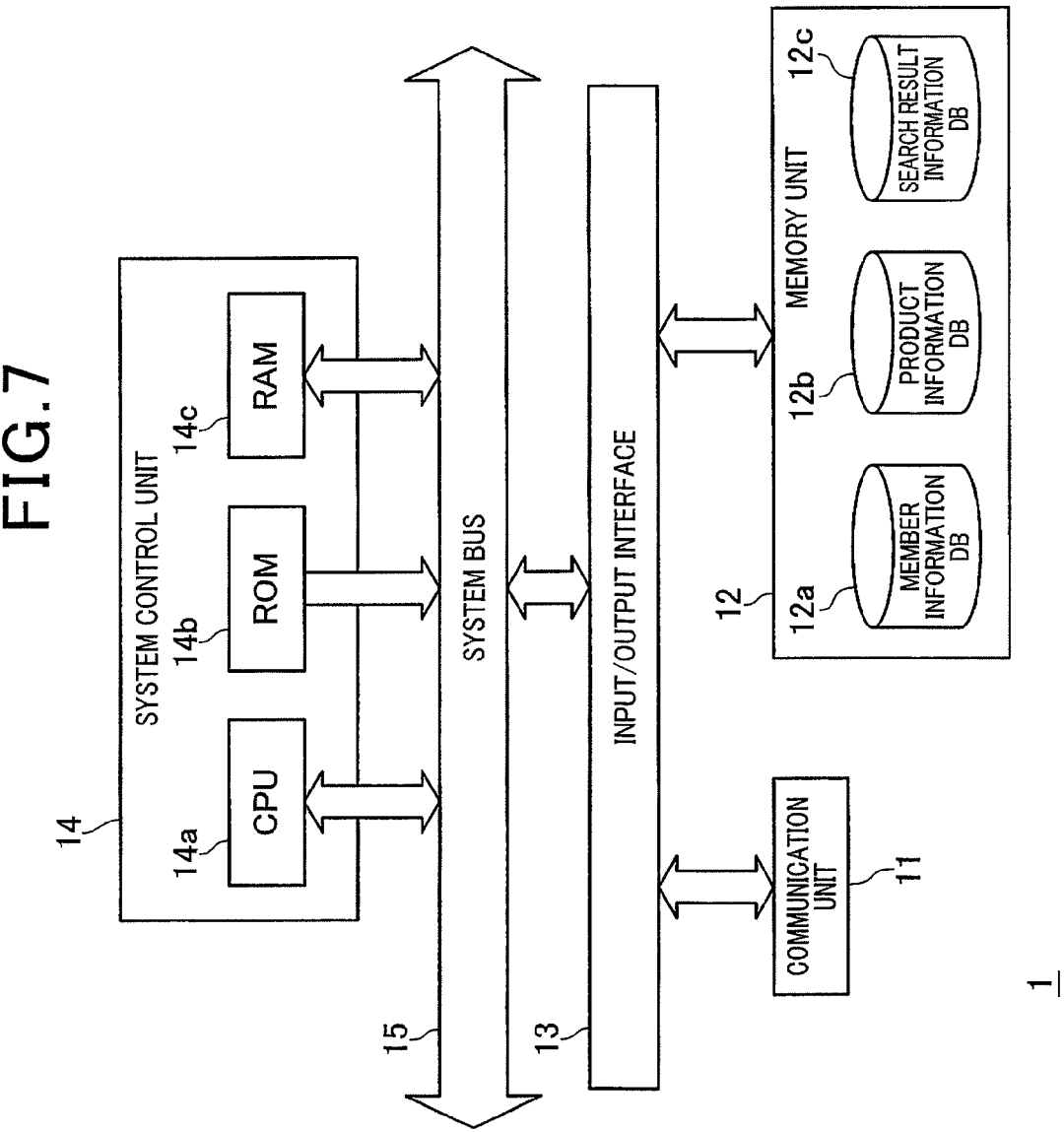

FIG.8A

MEMBER INFORMATION DB 12a

| USER ID |
|---|
| PASSWORD |
| NICKNAME |
| NAME |
| DATE OF BIRTH |
| GENDER |
| POSTAL CODE |
| ADDRESS |
| TELEPHONE NUMBER |
| EMAIL ADDRESS |

FIG.8B

PRODUCT INFORMATION DB 12b

| PRODUCT ID |
|---|
| STORE ID |
| PRODUCT CODE |
| GENRE INFORMATION |
| PRODUCT NAME |
| PRODUCT IMAGE URL |
| PRODUCT DESCRIPTION |
| PRODUCT PRICE |

FIG.8C

SEARCH RESULT INFORMATION DB 12c

| SEARCH DATE |
|---|
| USER ID |
| SEARCH CONDITIONS |
| SEARCH PRODUCT LIST |
| FINAL SELECTION RANKING |

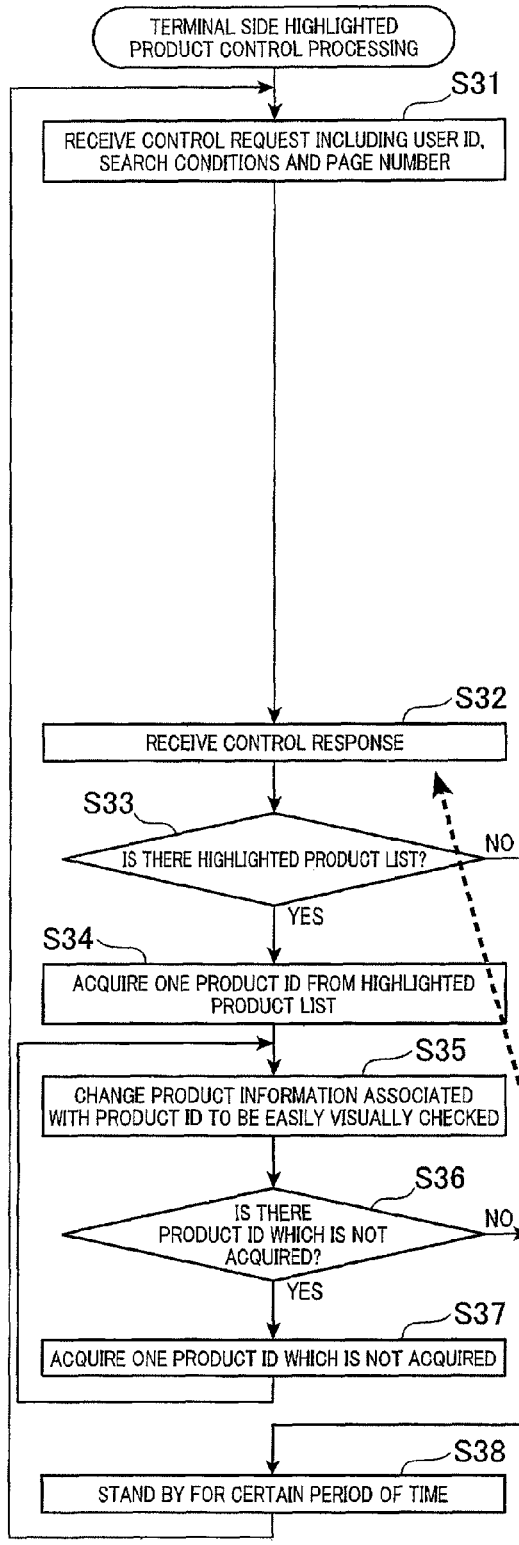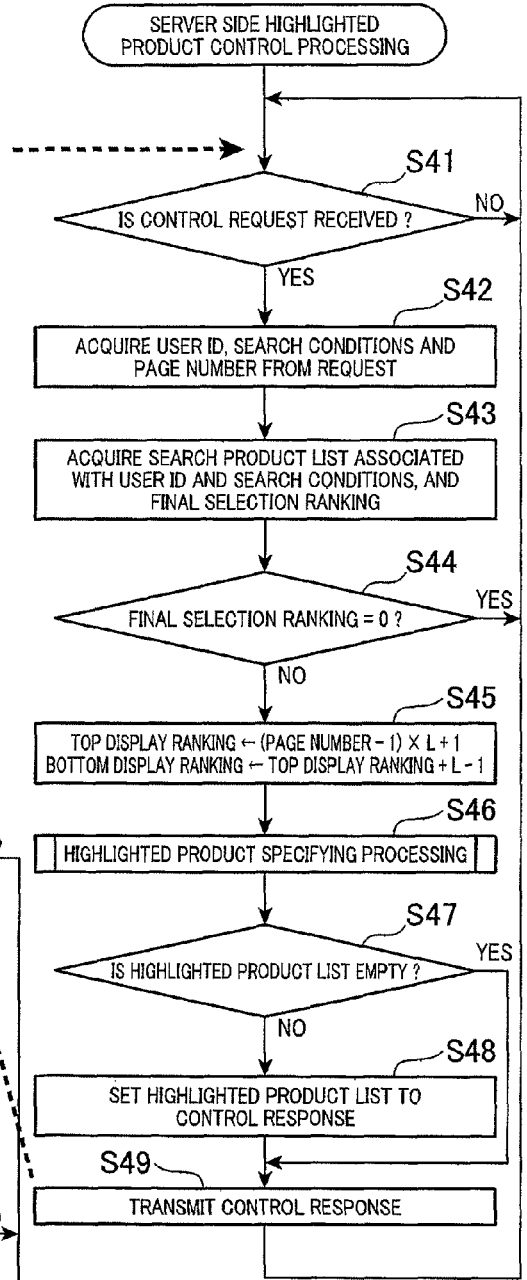

APPARATUS AND METHOD FOR CONTROLLING DISPLAY OF A SEARCH RESULT AND RECORDING MEDIUM THEREFOR

CROSS REFERENCE TO RELATED APPLICATIONS

This application is a National Stage of International Application No. PCT/JP2012/072146, filed on Aug. 31, 2012, which claims priority from Japanese Patent Application No. 2011-290017, filed Dec. 28, 2011, the contents of all of which are incorporated herein by reference in their entirety.

TECHNICAL FIELD

The present invention relates to a technical field of an information processing apparatus which displays, as a search result, a list of search targets which satisfy specified search conditions.

BACKGROUND ART

Conventionally, a search system is known which conducts a search based on search conditions specified by a user. Search targets in the search system include, for example, products, services, webpages and other pieces of information. The search system searches for search targets which satisfy search conditions, and displays information about the searched search targets as a search result. When a plurality of search targets is searched for, a list of searched search targets is displayed. The user selects information about a search target which the user desires, from the displayed information about the search targets to, for example, display information about details of the search target which the user desires or register as a favorite or in a bookmark the search target which the user desires.

The search system sorts a plurality of searched search targets according to given conditions to determine a ranking of each search target. Further, the search system displays a list of information about each search target according to an arrangement order matching the determined ranking. For example, Patent Literature 1 discloses a technique of sorting a presentation order of searched content in order of popularity, in order of price or in order of dictionary, and correcting the presentation order such that content which is not presented to the user is arranged at a higher ranking in a list.

PRIOR ART LIST

Patent Literature

Patent Literature 1: Japanese Patent Application Laid-Open (JP-A) No. 2008-146147

SUMMARY OF THE INVENTION

Problem to be Solved by the Invention

However, even if a user looks through information about search targets in the same order as an arrangement order of information about the search targets, the user does not at all times select information about search targets according to the same order as the arrangement order of information about the search targets. That is, when there is a plurality of search targets which the user desires, the arrangement order of information about a plurality of search targets is not at all times continuous. Hence, when the user selects information about a given search target from a list as information about a search target which the user desires, a search target associated with information displayed subsequently to the selected information is not the search target which the user desires in some cases. Even in this case, the user generally looks through information about search targets according to the same order as an arrangement order of information about search targets, and searches for another search target which the user desires. Hence, the user needs a time to find a search target which the user desires.

The present invention is made in light of the above, and an object of the present invention is to provide an information processing apparatus, an information processing method, an information processing program, and a recording medium which allow users to easily find information about search targets which the users are likely to desire.

Means for Solving the Problem

In order to solve the above problem, the invention according to claim 1 is an information processing device comprising:

a specifying means that specifies information selected by a user, from a plurality of pieces of information about search targets which are displayed as a search result according to an order matching a display ranking associated with the searched search targets, and which include attribute values of the search targets;

a comparing means that compares the attribute value of a first search target, with the attribute value of a second search target associated with the display ranking which is higher than the display ranking of the first search target associated with the information specified by the specifying means; and a control means that, when the attribute value of the first search target is advantageous for the user as a result of the comparison by the comparing means, performs control such that the information about a third search target whose attribute value is more advantageous for the user than that of the first search target changes to a display mode which is more easily visually checked than the information about a fourth search target whose attribute value is more disadvantageous for the user than that of the first search target.

The information about the first search target is information selected by the user, and therefore it is likely that the user has already seen the attribute value of the second search target included in the information about the second search target a display ranking of which is higher than that of the first search target. When the attribute value of the first search target is more advantageous for the user than that of the attribute value of the second search target, the attribute value of the first search target is likely to satisfy the conditions which the user desires. Consequently, the user is likely to desire the third search target the attribute value of which is more advantageous for the user than that of the first search target. According to the present invention, when the attribute value of the first search target is more advantageous for the user than the attribute value of the second search target, in the search result, the information about the third search target changes to a display mode which is more easily visually checked than that of the information about the fourth search target the attribute value of which is more disadvantageous for the user than that of the first search target. Consequently, it is possible to easily find information about a search target which the user is likely to desire.

The invention according to claim 2 is the information processing apparatus according to claim 1, wherein the information comprises the attribute values, and character strings related to the search targets;

the information processing apparatus further comprises an extracting means that, when as a result of the comparison made by the comparing means, in the second search target, there is a fifth search target whose attribute value is more advantageous than that of the first search target, extracts a word which is not included in the character string related to the first search target, from the character string related to the fifth search target; and when the extracting means extracts the word, the control means perform controls such that the information about the third search target whose character string does not include the word changes to a display mode which is more easily visually checked than the information about each of the fourth search target and the third search target whose character string includes the word.

When, in the second search target, there is the fifth search target the attribute value of which is more advantageous for the user than that of the first search target, the character string related to the fifth search target is likely to include a word which is a factor based on which the user decides that the fifth search target is not the search target which the user desires. When a word which is not included in the character string related to the first search target which the user desires is extracted from the character string related to the fifth search target, the present invention controls a display mode such that, among the third search target, only information about a search target the character string of which does not include the extracted word is easily visually checked. Consequently, information about the search target which the user is likely not to desire is not easily visually checked even if the search target has an attribute which satisfies the conditions which the user desires, so that it is possible to easily find information about a search target which the user is likely to desire.

The invention according to claim 3 is the information processing apparatus according to claim 2, wherein the extracting means extracts, from the character string related to the fifth search target, a word which is not included in the character string related to the search target among the second search target whose attribute value is more disadvantageous than that of the first search target nor the character string related to the first search target.

The user does not desire the fifth search target because there is likely to be a factor which, even though the fifth search target includes some inconvenience for the user, can give a more advantageous attribute value for the user to the fifth search target than the attribute value of the first search target. The present invention extracts the word which is not included in the character string of a search target among the second search target the attribute value of which is more disadvantageous than that of the first search target. Consequently, it is possible to extract a word related to a factor which, even though the fifth search target includes inconvenience for the user, can give to the fifth search target an attribute value which is advantageous for the user.

The invention according to claim 4 is an information processing method executed by an information processing apparatus comprising:

a specifying step of specifying information selected by a user, from a plurality of pieces of information about search targets which are displayed as a search result according to an order matching a display ranking associated with the searched search targets, and which include attribute values of the search targets;

a comparing step of comparing the attribute value of a first search target, with the attribute value of a second search target associated with the display ranking which is higher than the display ranking of the first search target associated with the information specified in the specifying step; and a control step of, when the attribute value of the first search target is advantageous for the user as a result of the comparison in the comparing step, performing control such that the information about a third search target whose attribute value is more advantageous for the user than that of the first search target changes to a display mode which is more easily visually checked than the information about a fourth search target whose attribute value is more disadvantageous for the user than that of the first search target.

The invention according to claim 5 is an information processing program causing a computer included in an information processing apparatus, to function as:

a specifying means that specifies information selected by a user, from a plurality of pieces of information about search targets which are displayed as a search result according to an order matching a display ranking associated with the searched search targets, and which include attribute values of the search targets;

a comparing means that compares the attribute value of a first search target, with the attribute value of a second search target associated with the display ranking which is higher than the display ranking of the first search target associated with the information specified by the specifying means; and a control means that, when the attribute value of the first search target is more advantageous for the user as a result of the comparison by the comparing means, performs control such that the information about a third search target whose attribute value is more advantageous for the user than that of the first search target changes to a display mode which is more easily visually checked than the information about a fourth search target whose attribute value is more disadvantageous for the user than that of the first search target.

The invention according to claim 6 is a recording medium having a computer-readable information processing program recorded thereon that causes a computer included in an information processing apparatus, to function as:

a specifying means that specifies information selected by a user, from a plurality of pieces of information about search targets which are displayed as a search result according to an order matching a display ranking associated with the searched search targets, and which include attribute values of the search targets;

a comparing means that compares the attribute value of a first search target, with the attribute value of a second search target associated with the display ranking which is higher than the display ranking of the first search target associated with the information specified by the specifying means; and a control means that, when the attribute value of the first search target is advantageous for the user as a result of the comparison by the comparing means, performs control such that the information about a third search target whose attribute value is more advantageous for the user than that of the first search target changes to a display mode which is more easily visually checked than the information about a fourth search target whose attribute value is disadvantageous for the user than that of the first search target.

Advantageous Effects of Invention

According to the present invention, when the attribute value of the first search target is more advantageous for the user than the attribute value of the second search target, in the search result, the information about the third search target changes to a display mode which is more easily visually checked than that of the information about the fourth search target the attribute value of which is more disadvantageous for the user than that of the first search target. Consequently, it is possible to easily find information about a search target which the user is likely to desire.

BRIEF DESCRIPTION OF DRAWINGS

FIG. 3 is a view illustrating a display example of a search result page.

FIG. 7 is a block diagram illustrating an example of a schematic configuration of an electronic mall server 1 according to an embodiment.

FIG. 8A is a view illustrating an example of content registered in a member information DB 12a. FIG. 8B is a view illustrating an example of content registered in a product information DB 12b. FIG. 8C is a view illustrating an example of content registered in a search result information DB 12c.

FIG. 10A is a flowchart illustrating a processing example in terminal side highlighted product control processing of a user terminal 3 according to an embodiment. FIG. 10B is a flowchart illustrating a processing example in server side highlighted product control processing of the system control unit 14 of the electronic mall server 1 according to an embodiment.

MODE FOR CARRYING OUT THE INVENTION

Hereinafter, an embodiment of the present invention will be described in detail with reference to the drawings. In addition, the embodiment will be described where the present invention is applied to an information providing system.

[1. Outline of Configuration and Function of Information Providing System]

Figure 1:
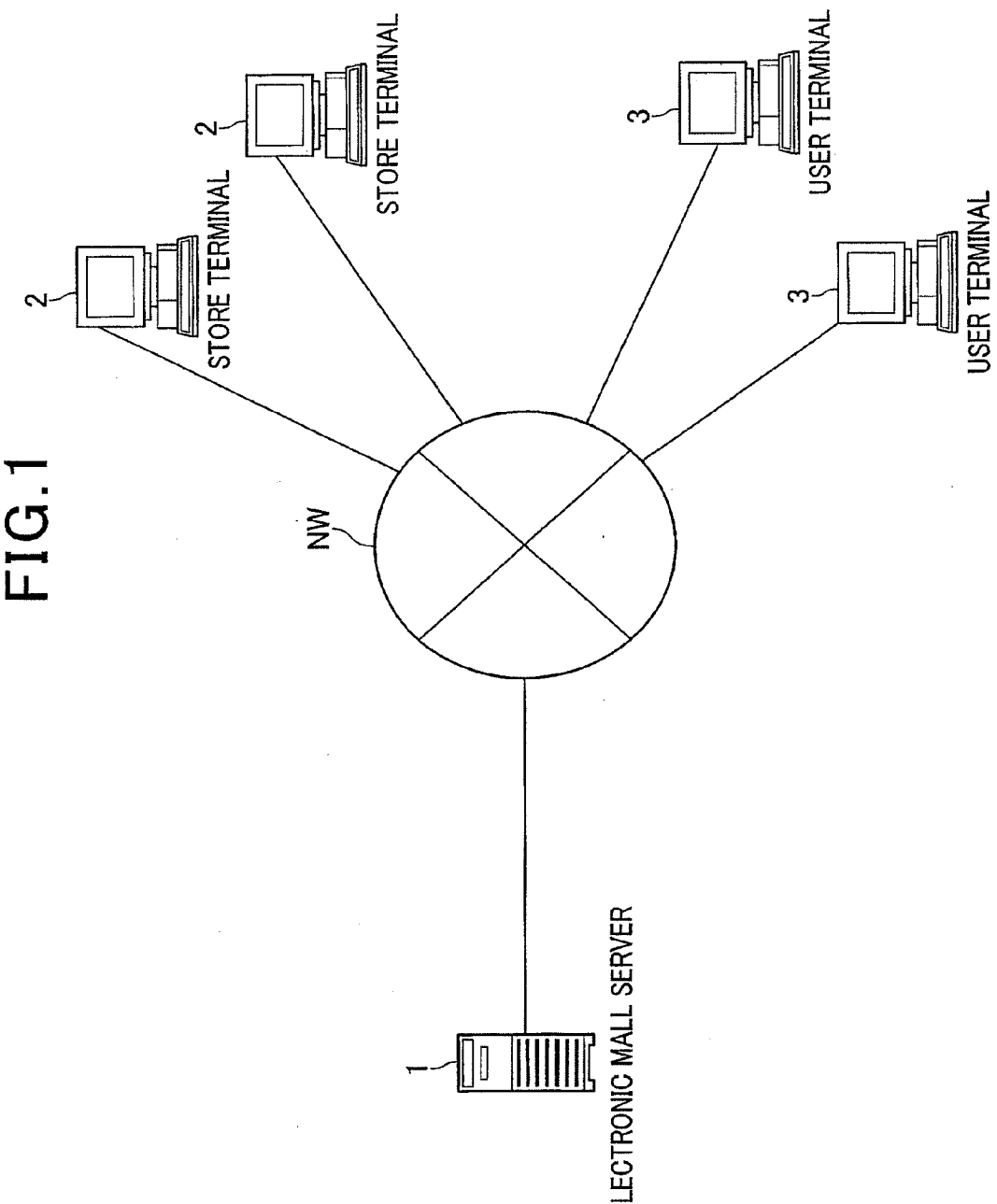
FIG. 1 is a view illustrating an example of a schematic configuration of an information providing system S according to an embodiment.

First, an outline of a configuration and a function of an information providing system S according to the present embodiment will be described using FIG. 1. FIG. 1 is a view illustrating an example of a schematic configuration of the information providing system S according to the present embodiment.

As illustrated in FIG. 1, the information providing system S includes an electronic mall server 1, a plurality of store terminals 2 and a plurality of user terminals 3. Further, the electronic mall server 1, and each store terminal 2 and each user terminal 3 can transmit and receive data to and from each other using, for example, TCP/IP for a communication protocol through a network NW. In addition, the network NW is constructed with, for example, the Internet, dedicated communication lines (for example, CATV (Community Antenna Television) lines), a mobile communication network (including, for example, base stations) and a gate way.

The electronic mall server 1 is a server apparatus which executes various types of processing related to an electronic mall at which products can be purchased. The electronic mall server 1 is an example of a search apparatus according to the present invention. A user can purchase a desired product from a desired store by utilizing the electronic mall. According to requests from the store terminals 2 and the user terminals 3, the electronic mall server 1, for example, transmits a webpage of the electronic mall or performs processing related to, for example, search or purchase of a product. In addition, a product is an example of a search target according to the present invention.

The store terminal 2 is a terminal apparatus which is utilized by, for example, an employee of a store which is listed in the electronic mall. The store terminal 2 is used to, for example, register information about a product to sell, in the electronic mall or check order content of the product. Further, the store terminal 2 accesses the electronic mall server 1 based on an operation by, for example, an employee to receive a webpage from the electronic mall server 1 and display the webpage. In the store terminal 2, software such as a browser and an electronic mail client is implemented. For the store terminal 2, for example, a personal computer is used.

The user terminal 3 is a terminal apparatus of a user who utilizes the electronic mall. The user terminal 3 accesses the electronic mall server 1 based on a user's operation to receive a webpage from the electronic mall server 1 and display the webpage. In the user terminal 3, software such as a browser and an electronic mail client is implemented. For the user terminal 3, for example, a personal computer, a mobile information terminal such as a PDA (Personal Digital Assistant) or a smart phone or a mobile telephone is used.

[2. Display of Search Result]

Next, display of a product search result in the information providing system S will be described using FIGS. 2 to 6.

The user can specify search conditions to look for purchase candidate products in the electronic mall. For example, a keyword and a product genre can be specified as search conditions. When the search conditions are specified, the electronic mall server 1 searches for products which satisfy the search conditions. Further, the electronic mall server 1 transmits a search result page to the user terminal 3. The search result page is a webpage which displays a list of the searched products.

Figure 2:
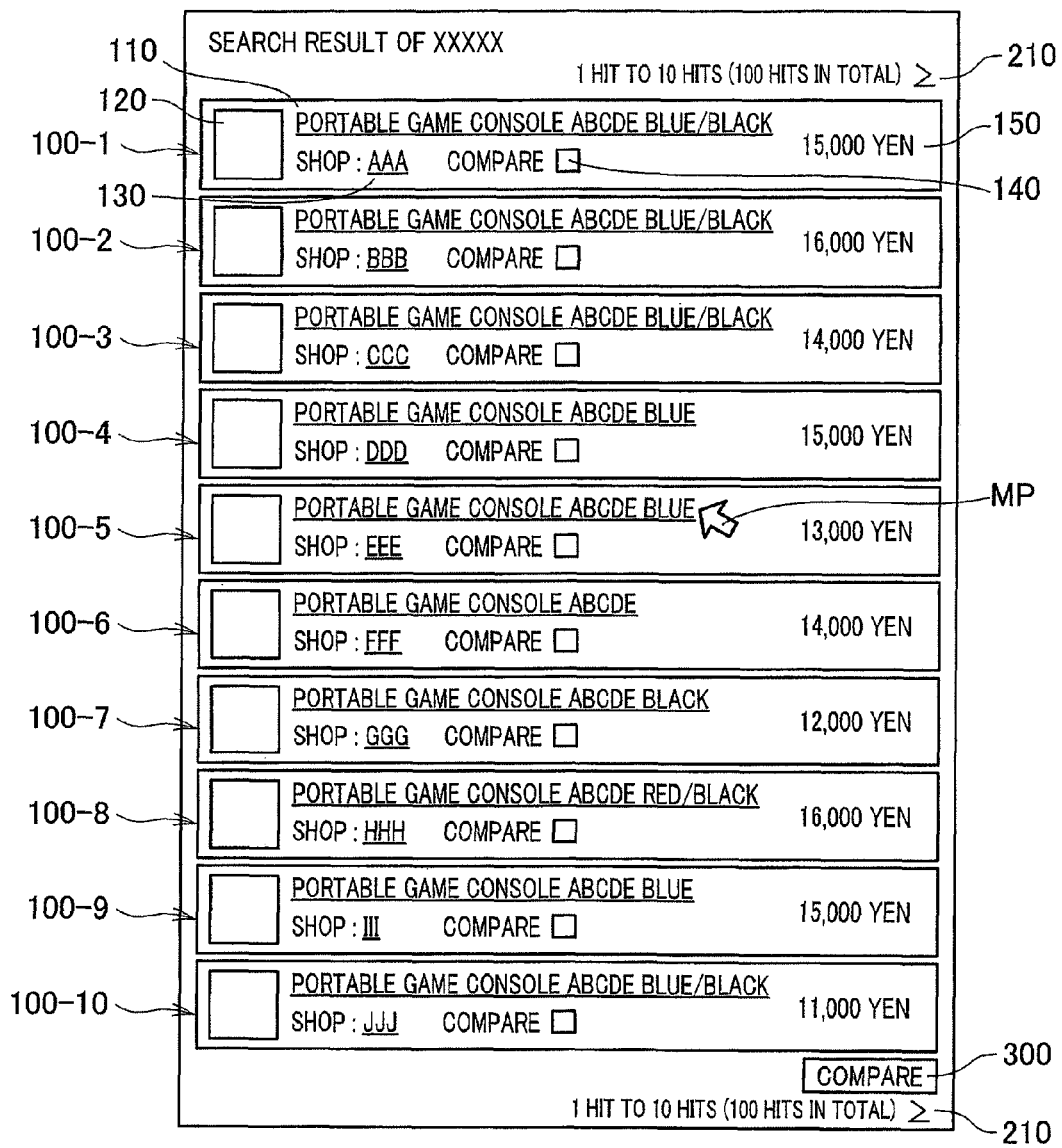
FIG. 2 is a view illustrating a display example of a search result page.

FIG. 2 is a view illustrating a display example of the search result page. As illustrated in FIG. 2, the search result page displays, for example, a plurality of pieces of appropriate product information 100-$i$, a next page link 210 and a compare button 300. In addition, the search result page illustrated in FIG. 2 is a search result page which shows a search result of a portable game console which has a name of "ABCDE".

The appropriate product information 100-$i$ is information about searched products. Further, the appropriate product information 100-$i$ is displayed per searched product. In addition, the appropriate product information 100-$i$ is an example of information about a search target according to the present invention. The appropriate product information 100-$i$ includes a product name 110, an image 120, a store name 130, a checkbox 140 and a price 150. The product name 110 is a name of a product. The product name 110 is a character string indicating a name of a product given by a store. Hence, the product name 110 is different from a formal name of a product in some cases. The image 120 is an image of a product. The store name 130 is a name of a store which is a distribution source of a product. The checkbox 140 is a checkbox for selecting whether or not to include the product associated with the appropriate product information 100-$i$ as comparison targets to compare a plurality of products. The price 150 is a price of a product.

In the product name 110 and the image 120, a hyperlink (referred to as a "link" below) to a product page is embedded. When a user selects the product name 110 or the image 120, a screen of the user terminal 3 displays a product page of a product associated with the selected product name 110 or image 120. A product page is a webpage which displays information about details related to a product. The user can purchase a product by performing a purchasing operation in the product page.

In the store name 130, a link to a store page is embedded. When the user selects the store name 130, the screen of the user terminal 3 displays a store page of a store associated with the selected store name 130. The store page is a webpage which displays information about details of a store.

When the user selects the checkbox 140, selects one or more products as comparison targets and then selects the compare button 300, the screen of the user terminal 3 displays a product comparison page. The product comparison page is a webpage which provides display such that information about each product of the comparison targets is easily compared.

When the user selects a previous page return button of a browser while a product page, a store page or a product comparison page is displayed, a search result page which is displayed before the product page, the store page or the product comparison page is displayed is displayed again.

Each searched product is assigned a display ranking for displaying each product as a search result. Further, each appropriate product information 100-$i$ is displayed according to an arrangement order matching the display ranking associated with each searched product. i of the appropriate product information 100-$i$ refers to a display ranking of a product associated with the appropriate product information 100-$i$. For example, information about a product the display ranking of which is the first place is appropriate product information 100-1. Further, information about a product the display ranking of which is the seventh place is appropriate product information 100-7.

In a first search result page, the maximum number of pieces of the appropriate product information 100-$i$ which can be displayed is fixed. This maximum number is referred to as "the maximum display number". When the number of searched products is larger than the maximum display number, the appropriate product information 100-$i$ about each searched product is allocated to a plurality of search result pages. When the maximum display number is L, the first search result page displays the appropriate product information 100-$i$ associated with products the display rankings of which are the first place to the L place. Further, the second search result page displays the appropriate product information 100-$i$ associated with products the display rankings of which are a L+1 place to a 2L place. In one search result page, each appropriate product information 100-$i$ is arranged from the top and displayed in order from the highest display ranking of a product. A search result page which is displayed immediately after the electronic mall server 1 conducts a search is the first search result page. FIG. 2 illustrates a display example of a first search result page when the maximum display number is 10.

When there is a next search result page of the currently displayed search result page, the search result page displays the next page link 210. When the user selects the next page link 210, the screen of the user terminal 3 displays a next search result page.

When the user selects the appropriate product information 100-$i$ in the above-described search result page, the user selects the appropriate product information 100-$i$ based on information in the appropriate product information 100-$i$. The appropriate product information 100-$i$ includes selecting the product name 110, selecting the image 120 and selecting the checkbox 140. More specifically, the user selects the appropriate product information 100-$i$ associated with a product which is advantageous for the user, based on an attribute value of a product displayed in the appropriate product information 100-$i$. A product has one or more attributes. Items of product attributes include, for example, a product name, a store of a distribution source and a price. Each product attribute has an attribute value matching an attribute item. The attribute value is information indicating content of an attribute. An attribute item which enables decision as to whether or not a product is advantageous for the user is price. The cheaper, the more advantageous for the user.

Generally, the user looks through each appropriate product information 100-$i$ displayed in a search result page in order from the top. That is, the user looks through the appropriate product information 100-$i$ in order from the highest display ranking of a product. Further, the user determines whether or not to select the appropriate product information 100-$i$ while, for example, looking at the price 150 in the appropriate product information 100-$i$. When the user looks through each appropriate product information 100-$i$ in order from the top, if the appropriate product information 100-$i$ including prices which the user desires as the prices 150 continues, the user can easily find the appropriate product information 100-$i$ about products which the user desires. For example, the user searches for products the prices of which are 13,000 yen or less. First, the user looks at the appropriate product information 100-1. When the price 150 of the appropriate product information 100-1 is 13,000 yen or less, the user selects the appropriate product information 100-1. Then, the user looks at the appropriate product information 100-2. When the price 150 of the appropriate product information 100-2 is also 13,000 yen or less, the user selects the appropriate product information 100-2. In this case, the user can find the appropriate product information 100-$i$ about a product which the user desires by moving the user's eyes by a distance corresponding to one appropriate product information 100-$i$. However, the appropriate product information 100-$i$ about products which the user desires does not continue at all times, and therefore it is not easy to find the appropriate product information 100-$i$ about the product which the user desires.

A specific example will be described below. In the search result page in FIG. 2, as the prices 150 of the appropriate product information 100-1 to appropriate product information 100-10, 15,000 yen, 16,000 yen, 14,000 yen, 15,000 yen, 13,000 yen, 14,000 yen, 12,000 yen, 16,000 yen, 15,000 yen, and 11,000 yen are displayed in order from the top. It is assumed hereinafter that the user looks for products prices of which are 13,000 yen or less. The appropriate product information 100-*i* the price 150 of which is 13,000 yen or less includes the appropriate product information 100-5, the appropriate product information 100-7 and the appropriate product information 100-10. The user looks through each appropriate product information 100-*i* in order from the appropriate product information 100-1. Further, the user finds the appropriate product information 100-5, and selects the appropriate product information 100-5. Then, the user looks through each appropriate product information 100-*i* in order from the appropriate product information 100-6. The price 150 of the appropriate product information 100-6 is 14,000 yen, and the user decides that the appropriate product information 100-6 is not the appropriate product information 100-*i* about a product which the user desires, and looks at the appropriate product information 100-7 next. Further, the user selects the appropriate product information 100-7. Then, the user looks at the appropriate product information 100-8 and the appropriate product information 100-9, and decides that these are not the appropriate product information 100-*i* about a product which the user desires. Next, the user looks at the appropriate product information 100-10. Further, the user selects the appropriate product information 100-10. Thus, there are times to make decision on the appropriate product information 100-6, the appropriate product information 100-8 and the appropriate product information 100-9 between selection of the appropriate product information 100-5 and selection of the appropriate product information 100-10. Between these times, a long time is required to find the appropriate product information 100-7 and the appropriate product information 100-10. Further, the number of times of decision increases, and therefore it is bothering to find the appropriate product information 100-*i* about a product which the user desires.

The electronic mall server 1 controls a display mode of the appropriate product information 100-*i* in search result pages to allow the user to easily find the appropriate product information 100-*i* about a product which the user desires. More specifically, when the user selects one appropriate product information 100-*i*, the electronic mall server 1 specifies the selected appropriate product information 100-*i*. A product associated with the selected appropriate product information 100-*i* is referred to as a "selected product". The selected product is an example of a first search target according to the present invention. Further, the electronic mall server 1 specifies a display ranking of the selected product. Next, the electronic mall server 1 compares an attribute value of the selected product and an attribute value of each product associated with a higher display ranking than the display ranking of the selected product. A product associated with a higher display ranking than the display ranking of the selected product is referred to as a "higher-ranking product". The "higher-ranking product" is an example of a second search target according to the present invention. In this case, when the attribute value of the selected product is more advantageous for the user than attribute values of all higher-ranking products, the electronic mall server 1 performs control such that the appropriate product information 100-*i* about products the attribute values of which are more advantageous for the user than that of the selected product changes to display modes which are more easily visually checked than that of the appropriate product information 100-*i* about products the attribute values of which are more disadvantageous for the user than that of the selected product. A product an attribute value of which is more advantageous for the user than that of the selected product is referred to as an "advantageous product". A product an attribute value of which is more disadvantageous for the user than that of the selected product is referred to as a "disadvantageous product". The advantageous product is an example of a third search target according to the present invention. Further, the disadvantageous product is an example of a fourth search target according to the present invention.

An attribute item used to compare attribute values is, for example, set in advance. The attribute item is a product price with the example in FIG. 2. When the user put heavy weight on an attribute item set in advance, the user is supposed to select the appropriate product information 100-*i* about a product an attribute value of the attribute item of which is more advantageous for the user than a lower limit reference value set by the user. As described above, the user basically looks through each appropriate product information 100-*i* in order from the top. Hence, at a point of time when the user selects the given appropriate product information 100-*i*, the user is supposed to have already looked at the appropriate product information 100-*i* about products associated with display rankings equal to or higher than the display ranking of the selected product associated with this product information 100-*i*. Further, products associated with the appropriate product information 100-*i* which the user does not select among the appropriate product information 100-*i* which the user looks at is likely to be products which are more disadvantageous for the user than the lower limit reference value set by the user.

Processing of comparing the attribute value of the selected product and an attribute value of each higher-ranking product is processing of deciding whether or not the user puts heavy weight on the attribute item set in advance. When the attribute value of the selected product is more advantageous for the user than the attribute values of all higher-ranking products in terms of the attribute item set in advance, it is possible to decide that the user puts heavy weight on this attribute item. Further, the attribute value of the selected product is assumed to be more advantageous for the user than the reference value set by the user. Hence, advantageous products the attribute values of which are more advantageous than that of the selected product are products which the user is likely to desire. Hence, the appropriate product information 100-*i* about a product which the user is likely to desire is more easily visually checked among a plurality of pieces of appropriate product information 100-*i* in search result pages, so that the user can easily find the appropriate product information 100-*i* about the product which the user desires.

A specific example will be described below. FIG. 3 is a view illustrating a display example of a search result page after the appropriate product information 100-5 is selected. In FIG. 3, the same elements as those in FIG. 2 will be assigned the same reference numerals. Assume that, in the search result page illustrated in FIG. 2, the user selects the product name 110 of the appropriate product information 100-5 by moving a mouse pointer MP. Then, a product page of a product the display ranking of which is the fifth place is displayed. When the user selects the previous page return button after browsing the product page, for example, a search result page illustrated in FIG. 3 is displayed. The difference between the search result page illustrated in FIG. 2 and the search result page illustrate in FIG. 3 is that border frames of the appropriate product information 100-7 and the appropriate product information 100-10 are bolder than border frames of other pieces of the appropriate product information 100-*i* in FIG. 3. That is, the appropriate product information 100-7 and the appropriate product information 100-10 are highlighted. 13,000 yen which is a price of the product the display ranking of which is the fifth place is cheaper than prices of all products the display rankings of which are the first place to the fourth place. Hence, a display mode of the appropriate product information 100-*i* about a product the price of which is cheaper than 13,000 yen changes to a display mode which is easily visually checked. Consequently, the user can easily find the appropriate product information 100-*i* about products the prices of which are cheaper than that of the selected product. Further, the display modes of the appropriate product information 100-*i* are only changed, and each appropriate product information 100-*i* is not rearranged in order from, for example, the cheapest price. Hence, the user does not have to look through each appropriate product information 100-*i* again in order from the top of the search result page.

In case that the user selects the product name 110 or the image 120, the display mode of the appropriate product information 100-*i* changes in a search result page displayed when the user selects the previous page return button while the product page is displayed. Meanwhile, when the user selects the checkbox 140, a display mode of the appropriate product information 100-*i* changes immediately after the checkbox 140 is selected. In addition, when the user selects, for example, a button in the appropriate product information 100-*i* and a search result page is displayed which allows an operation of, for example, putting a product in a shopping cart, purchasing the product or registering the product as a favorite or in a bookmark to be performed, this operation is also an example of selection of the appropriate product information 100-*i*. Further, when, for example, the user does not move the mouse pointer MP on the product name 110 for a certain period of time, it is also possible to display a preview of a product page in the search result page. The operation of not moving the mouse pointer MP on the product name 110 for a certain period of time in this case is also an example of selection of the appropriate product information 100-*i*.

Assume that after selecting the appropriate product information 100-5, the user selects the appropriate product information 100-*i* in order of the appropriate product information 100-7 and the appropriate product information 100-10. When the appropriate product information 100-7 is selected, only the display mode of the appropriate product information 100-10 changes to a display mode which is easily visually checked. When the appropriate product information 100-10 is selected, the display mode of any appropriate product information 100-*i* does not change to a display mode which is easily visually checked, either. That is, the electronic mall server 1 controls the display mode of the appropriate product information 100-*i* using as a reference an attribute value of a product associated with the appropriate product information 100-*i* which is selected last.

Figure 4:
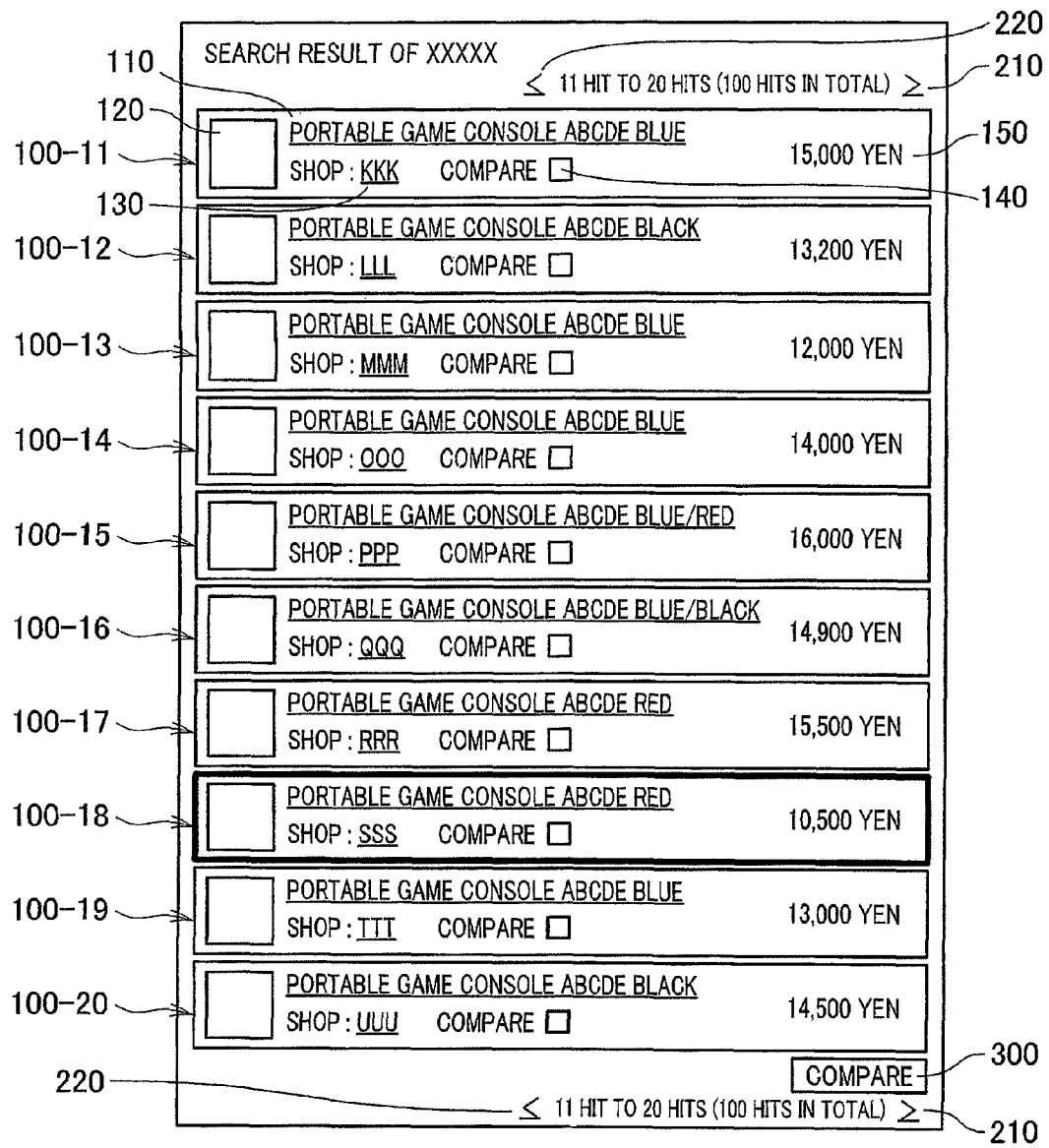
FIG. 4 is a view illustrating a display example of a search result page.

FIG. 4 is a view illustrating a display example of a search result page displayed when the next page link 210 is selected. In FIG. 4, the same elements as those in FIG. 2 will be assigned the same reference numerals. When the user selects the next page link 210 after selecting the appropriate product information 100-10, for example, a search result page illustrated in FIG. 4 is displayed. As illustrated in FIG. 4, the search result page displays, for example, appropriate product information 100-11 to appropriate product information 100-20, the next page link 210, a previous page link 220 and the compare button 300.

When there is a previous search result page of the currently displayed search result page, the search result page displays the previous page link 220. When the user selects the previous page link 220, the screen of the user terminal 3 displays a previous search result page.

As the prices 150 from the appropriate product information 100-11 to the appropriate product information 100-20, 15,000 yen, 13,200 yen, 12,000 yen, 14,000 yen, 16,000 yen, 14,900 yen, 15,500 yen, 10,500 yen, 13,000 yen and 14,500 yen are displayed in order from the top. In this case, a display mode of the appropriate product information 100-*i* about a product the price of which is cheaper than 11,000 yen is displayed in a display mode which is easily visually checked. More specifically, the border frame of the appropriate product information 100-18 is bolder than the border frames of other pieces of the appropriate product information 100-*i*.

When the user selects the next page link 210 without selecting the appropriate product information 100-7 and the appropriate product information 100-10 after selecting the appropriate product information 100-5 in the search result page illustrated in FIG. 2, display modes of the appropriate product information 100-13 and the appropriate product information 100-18 the prices of which are cheaper than 13,000 yen change to display modes which are easily visually checked. That is, the electronic mall server 1 controls the display mode of the appropriate product information 100-*i* assuming that the user does not look at the appropriate product information 100-6 to 100-10 about products associated with lower display rankings than a display ranking of a selected product. However, when the next page link 210 is selected, the electronic mall server 1 may control the display mode of the appropriate product information 100-*i* assuming that the user looks at all pieces of the appropriate product information 100-*i* displayed in the search result page. That is, the electronic mall server 1 may select a product an attribute value of which is compared with the selected product, from a product the display ranking of which is the first place to a product the display ranking of which is the lowest among products associated with the appropriate product information 100-*i* displayed in the search result page. Meanwhile, the selected product itself is excluded. When the electronic mall server 1 performs such processing, and the user selects the next page link 210 without selecting the appropriate product information 100-7 and the appropriate product information 100-10, the display mode of any appropriate product information 100-*i* does not change to a display mode which is easily visually checked in a second search result page, either. In this case, it is possible to assume that the user does not put heavy weight on price.

Further, whether or not to change the display modes of the appropriate product information 100-*i* about products the attribute values of which are the same as that of the selected product, to display modes which are easily visually checked is arbitrary.

Furthermore, a display mode as a control target is not limited only to boldness of the border frame of the appropriate product information 100-*i*. For example, a display mode as a control target may be, for example, a color of a border frame in the appropriate product information 100-*i*, the size, the boldness, a color, transparency or a font style of characters in the appropriate product information 100-*i* or a color of a background of the appropriate product information 100-*i*.

Further, when the user selects the previous page return button or the user selects the checkbox 140 while a product page or a store page is displayed, the electronic mall server 1 may not change the display mode of the appropriate product information 100-*i*. Instead, the appropriate product information 100-*i* about advantageous products only needs to be displayed in display modes which are easily visually checked in a search result page displayed when the user selects the next page link 210. Further, when the user selects the previous page return button while a product comparison page is displayed, the electronic mall server 1 may change the display mode of the appropriate product information **100-*i***.

Furthermore, when the user selects a plurality of pieces of appropriate product information **100-*i*, the electronic mall server 1 may control the display mode of the appropriate product information 100-*i* using as the reference the most disadvantageous attribute value for the user among attribute values of products associated with a plurality of pieces of selected appropriate product information 100-*i*. This is because every attribute value of the product associated with each of a plurality of pieces of selected appropriate product information 100-*i* can be assumed to be more advantageous for the user than the reference value set by the user. When, for example, the user selects the next page link 210 after selecting the appropriate product information 100-5, the appropriate product information 100-7 and the appropriate product information 100-10 in the search result page illustrated in FIG. 2, display modes of the appropriate product information 100-13 and the appropriate product information 100-18** the prices of which are cheaper than 13,000 yen change to display modes which are easily visually checked.

Further, an attribute item used to decide to control the display mode of the appropriate product information **100-*i* is not limited only to price. An attribute item which enables decision as to an advantage or a disadvantage for the user and the attribute value of which is displayed in the appropriate product information 100-*i* may be used to decide to control the display mode of the appropriate product information 100-*i***. The attribute items which enable decision as to an advantage or a disadvantage for the user include, for example, a shipping method, a shipping fee, a point grant rate, an evaluation value and a product specification. The shipping method includes, for example, next day delivery and normal delivery. The next day delivery is a delivery method where a product is delivered without delay by the next day of a day when the product is ordered. The normal delivery is a delivery method where a product is not necessarily delivered by the next day of a day when the product is ordered. The next day delivery is more advantageous for the user than the normal delivery. Further, the lower shipping fee, the more advantageous for the user. The point grant rate is a rate of a point given to the user with respect to a product price when the user purchases a product. This point has a value equivalent to money and can be allotted to payment when the user purchases a product in the electronic mall. The higher point grant rate, the more advantageous for the user. The evaluation value is a value which indicates a level of an evaluation on a product given by the user. The user can register a review about a product and give an evaluation value to the product. The evaluation value which is an attribute value of a product is a value obtained by averaging evaluation values given by users. The higher evaluation value, the more advantageous for the user. In case of the product specification, which attribute value is advantageous or disadvantageous for the user varies depending on items of the specification.

Further, when attribute values of a plurality of attribute items which enables decision as to an advantageous or a disadvantageous for the user are displayed in the appropriate product information **100-*i*, the electronic mall server 1 may select an attribute item used to control the display mode of the appropriate product information 100-*i* from a plurality of attribute items. More specifically, the electronic mall server 1 compares for each attribute item an attribute value of a selected product and an attribute value of each higher-ranking product. Next, the electronic mall server 1 specifies an attribute item the attribute value of the selected product of which is more advantageous for the user than attribute values of all higher-ranking products. Further, the electronic mall server 1 performs control such that the display modes of the appropriate product information 100-*i*** about products the attribute values of which are more advantageous for the user than that of the selected product in terms of the specified attribute item change to display modes which are easily visually checked.

Meanwhile, even when the attribute values displayed in the appropriate product information **100-*i* are more advantageous for the user than the reference value set by the user, the user does not select the appropriate product information 100-*i* in some cases. In this case, it is assumed that the user also takes into account the other pieces of information displayed in the appropriate product information 100-*i* while making decision on a product which the user desires based on the attribute value. That is, it is assumed that information which is a factor based on which the user decides that the user does not desire a product is included in the appropriate product information 100-*i*. Such information is, for example, the product name 110. The product name 110 is a character string which a store can freely set and, consequently, various pieces of information can be inputted in the product name 110. Hence, when there is a product an attribute value of which is more advantageous for the user than that of the selected product of the higher-ranking product, the electronic mall server 1 extracts a feature word of this product from the character string displayed in the appropriate product information 100-*i* related to this product. Meanwhile, a product among the higher-ranking products an attribute value of which is more advantageous for the user than that of the selected product is referred to as a "higher-ranking advantageous product". The higher-ranking advantageous product is an example of a fifth search target according to the present invention. A feature word of the higher-ranking advantageous product is a word which is not included in the character string of the selected product. When there is a plurality of higher-ranking advantageous products, the electronic mall server 1 may extract a word included in every character string of a plurality of higher-ranking advantageous products as the feature word of the higher-ranking products, or may extract a word included in at least one character string of a plurality of higher-ranking advantageous products as the feature word of the higher-ranking advantageous products. When the feature word is extracted, the electronic mall server 1 performs control such that display modes of only the appropriate product information 100-*i*** about products among advantageous products the character strings of which do not include the feature word change to display modes which are easily visually checked.

The feature word is included in the character strings of the higher-ranking advantageous products and is not included in the character string of the selected product, and therefore, it is likely that, because the user looks at the feature word, the user does not select the appropriate product information **100-*i* about the higher-ranking advantageous products. Hence, even if a product has an attribute value which is more advantageous than that of the selected product, the product including the feature word in the character string is likely to be a product which the user does not desire. The display mode of the appropriate product information 100-*i* about the product which the user is likely not to desire does not change to a mode which is easily visually checked, so that the user can easily find the appropriate product information 100-*i*** about a product which the user desires.

When extracting a feature word, the electronic mall server 1 may extract a word which is not included in the character string of the selected product and which is not included even in character strings of products of the higher-ranking products attribute values of which are more disadvantageous for the user than that of the selected product, from the character strings of the higher-ranking advantageous products. A product of higher-ranking products an attribute value of which is more disadvantageous for the user than that of the selected product is referred to as a "higher-ranking disadvantageous product". The character strings of the higher-ranking disadvantageous products are also taken into account because it is assumed that there is a reason why attribute values of the higher-ranking advantageous products are more advantageous than the attribute value of the selected product. That is, it is assumed that even though the attribute values of the higher-ranking advantageous products are more advantageous than the attribute value of the selected product, there is some inconvenience for the user. It is likely that there is inconvenience for the user, and therefore the user does not select the higher-ranking advantageous products. In this case, the feature word extracted from the character strings of the higher-ranking advantageous products is a word which represents that the attribute values of the higher-ranking advantageous products are more advantageous than the attribute value of the selected product, and which represents that there is some disadvantage for the user. Hence, the feature word is a word which is not included in the character strings of the higher-ranking disadvantageous products.

Figure 5:
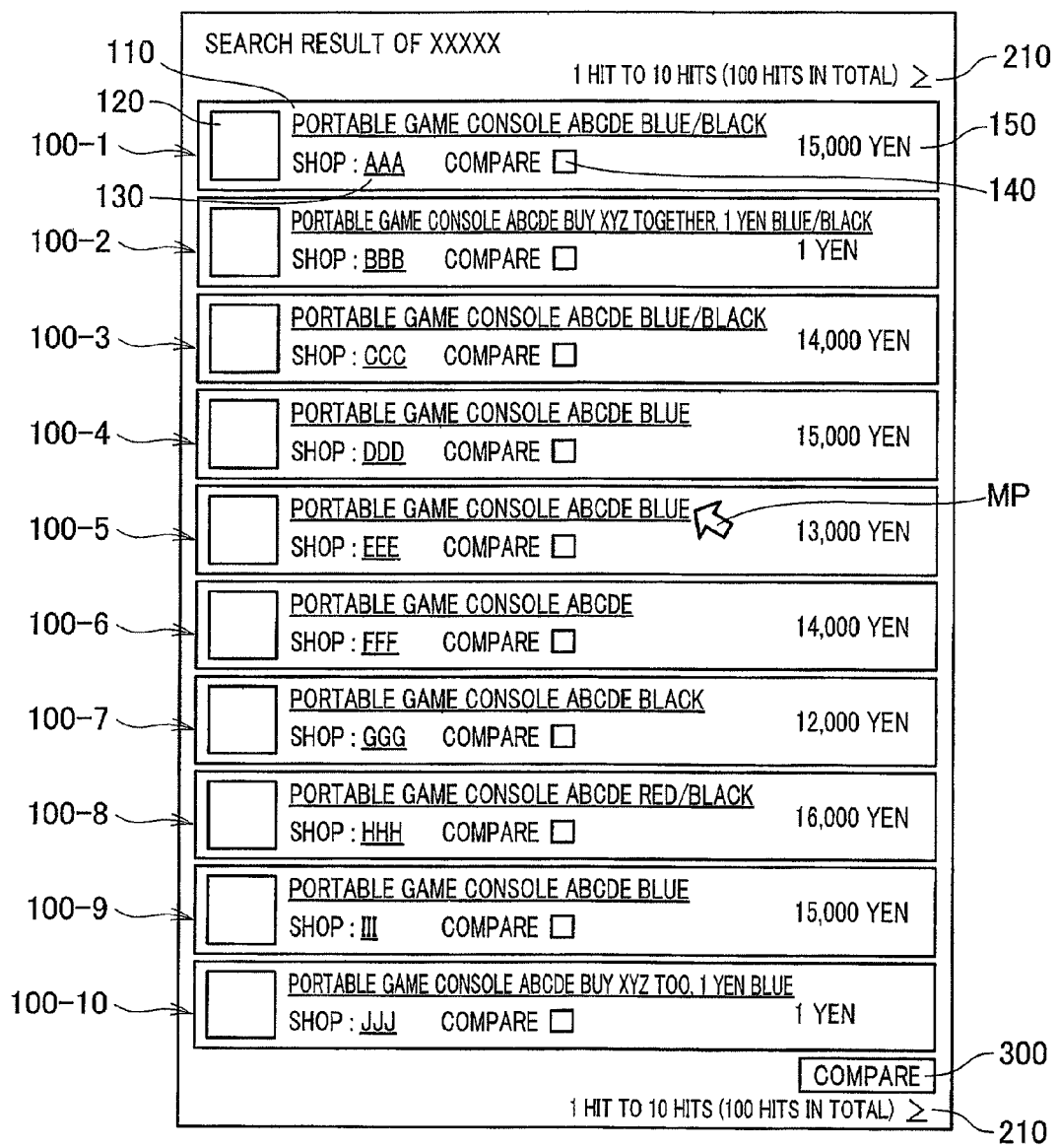
FIG. 5 is a view illustrating a display example of a search result page.

A specific example will be described below. FIG. 5 is a view illustrating a display example of a search result page. In FIG. 5, the same elements as those in FIG. 2 will be assigned the same reference numerals. The difference between the search result page illustrated in FIG. 2 and the search result page illustrate in FIG. 3 is that the product names 110 and the prices 150 of the appropriate product information 100-2 and the appropriate product information 100-10 are different. In FIG. 5, the prices 150 of the appropriate product information 100-2 and the appropriate product information 100-10 are each 1 yen.

The product name 110 of each appropriate product information 100-i includes a "portable game console" and "ABODE". "ABODE" is a name of a portable game console. Further, the product name 110 of each appropriate product information 100-i includes at least one of "blue", "black" and "red". "Blue", "black" and "red" refer to colors of bodies of portable game consoles. The product name 110 of the appropriate product information 100-5 is "portable game console, ABODE, blue". Meanwhile, the product name 110 of the appropriate product information 100-2 is "portable game console, ABODE, Buy XYZ together, Pay 1 yen, blue•black". "XYZ" is another product which is bundled with ABODE. That is, when the user purchases a product the display ranking of which is the second place, the product name 110 indicates that the user needs to purchase XYZ together. Further, it is assumed that a condition requires that the user purchases XYZ, too, and therefore the price is 1 yen.

When the user selects the appropriate product information 100-5, a higher-ranking advantageous product is a product the display ranking of which is the second place. Hence, from the product name 110 of the appropriate product information 100-2, "portable game console", "ABCDE", "XYZ", "together", "purchase", "1 yen", "blue" and "black" are extracted. Meanwhile, for example, words representing common nouns and quantities are excluded from feature words. Hence, "1 yen" is not a feature word. Further, "portable game console", "ABCDE" and "blue" are also included in the product name 110 of the appropriate product information 100-5. Hence, these words are also excluded from features words. "Black" is included in the product names 110 of the appropriate product information 100-1 and the appropriate product information 100-3. Hence, "black" is also excluded from feature words. The rest of "XYZ", "together" and "purchase" are included neither in the product names 110 of the appropriate product information 100-1 nor the appropriate product information 100-3 to 5. Hence, "XYZ", "together" and "purchase" are extracted as feature words.

Figure 6:
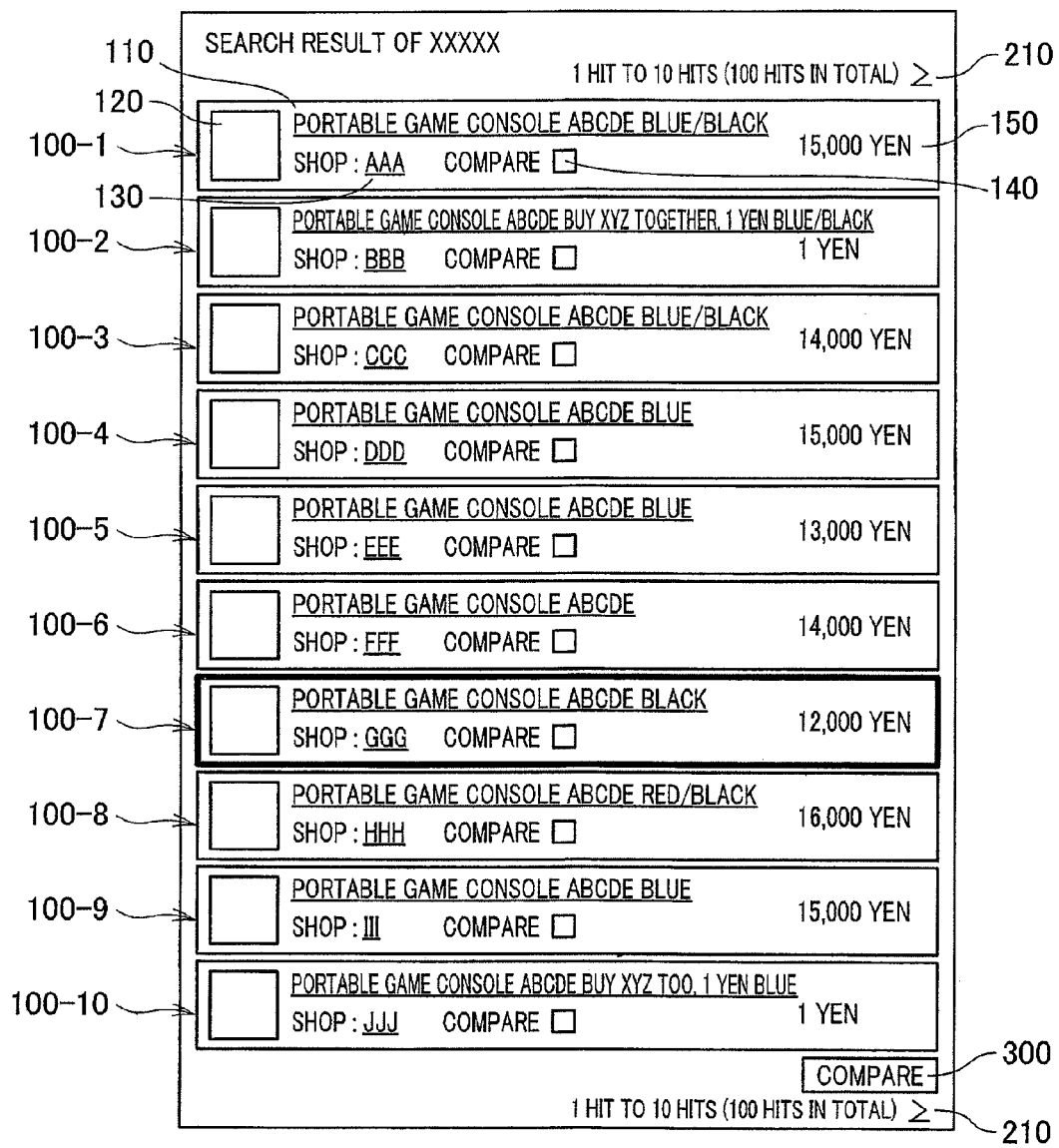
FIG. 6 is a view illustrating a display example of a search result page.

FIG. 6 is a view illustrating a display example of a search result page. In FIG. 6, the same elements as those in FIG. 5 will be assigned the same reference numerals. When the user selects the appropriate product information 100-5, the display mode of the appropriate product information 100-7 changes to a display mode which is easily visually checked as illustrated in FIG. 6. This is because the product name 110 of the appropriate product information 100-7 includes none of "XYZ", "together" and "purchase". Meanwhile, the display mode of the appropriate product information 100-10 does not change to a display mode which is easily visually checked. This is because the product name 110 of the appropriate product information 100-10 includes "XYZ" and "purchase".

In addition, the electronic mall server 1 may use, for example, PMI (Point-wise Mutual Information) and TF-IDF (Term Frequency Inverse Document Frequency) to extract a feature word. When, for example, deciding using PMI whether or not a given word x is a feature word of a higher-ranking advantageous product y, the electronic mall server 1 calculates PMI according to the following equation.

$$PMI(x, y) = \log \frac{P(x, y)}{P(x)P(y)} \qquad \text{[Equation 1]}$$

Meanwhile, P(x) is a rate of products the character strings of which include the word x among products the display rankings of which are higher than that of a selected product. Further, P(y) is a rate of products which are higher-ranking advantageous products among products the display rankings of which are higher than that of a selected product. Furthermore, P(x,y) is a rate of products the character strings of which include the word x and which are higher-ranking advantageous products among products the display rankings of which are higher than that of a selected product. When calculated PMI is a threshold set in advance or more, the electronic mall server 1 decides that the word x is a feature word. Hence, when PMI is the threshold or more, even if the character strings of part of products among a plurality of higher-ranking advantageous products do not include the word x, the word x is decided to be a feature word. Further, when PMI is the threshold or more, even if character strings of part of products among a plurality of higher-ranking disadvantageous products include the word x, the word x is decided to be a feature word. Hence, a threshold is preferably set such that the word x is decided to be a feature word when character strings of most of higher-ranking advantageous products include the word x and character strings of most of higher-ranking disadvantageous products do not include the word x. In addition, when the word x is included in the character string of the selected product, the electronic mall server 1 does not decide that the word x is a feature word.

Further, when extracting a feature word, the electronic mall server 1 does not need to take into account character strings of higher-ranking disadvantageous products. That is, the electronic mall server 1 may extract even a word included in character strings of higher-ranking disadvantageous products as a feature word. With examples in FIGS. 5 and 6, "XYZ", "together", "purchase" and "black" are extracted as feature words. In this case, none of display modes of the appropriate product information 100-*i* does not change to a display mode which is easily visually checked. This is because the product name 110 of the appropriate product information 100-7 includes "black".

Further, whether or not to include higher-ranking products the attribute values of which are the same as that of the selected product in the higher-ranking advantageous products is arbitrary.

Furthermore, character strings which are feature word extraction targets are not limited to product names. The character strings which are feature word extraction targets only need to be character strings indicated in the appropriate product information 100-*i*. For example, character strings of feature word extraction targets may be part of description of products. Further, even when the electronic mall server 1 stores attribute values of a given attribute item in a format other than character strings and displays character strings representing these attribute value in the appropriate product information 100-*i*, the character strings may be feature word extraction targets.

Furthermore, when there are higher-ranking advantageous products, the electronic mall server 1 may not extract feature words and perform control such that display modes of the appropriate product information 100-*i* associated with the advantageous products change to display modes which are easily visually checked.

[3. Configuration of Electronic Mall Server]

Next, a configuration of the electronic mall server 1 will be described using FIGS. 7 and 8.

FIG. 7 is a block diagram illustrating an example of a schematic configuration of the electronic mall server 1 according to the present embodiment. As illustrated in FIG. 7, the electronic mall server 1 has a communication unit 11, a memory unit 12, an input/output interface 13 and a system control unit 14. Further, the system control unit 14 and the input/output interface 13 are connected through a system bus 15.

The communication unit 11 connects to the network NW, and controls communication states with the store terminals 2 and the user terminals 3.

The memory unit 12 is configured by, for example, a hard disk drive. In this memory unit 12, databases such as a member information DB 12*a*, a product information DB 12*b* and a search result information DB 12*c* are constructed. "DB" is an abbreviation of a database.

FIG. 8A is a view illustrating an example of content registered in the member information DB 12*a*. In the member information DB 12*a*, member information related to users registered as members in the information providing system S is registered. More specifically, in the member information DB 12*a*, user attributes such as a user ID, a password, a nickname, a name, a date of birth, the gender, a postal code, an address, a telephone number and an email address are associated and registered per user. The user ID is user identification information.

FIG. 8B is a view illustrating an example of content registered in the product information DB 12*b*. In the product information DB 12*b*, product information related to products sold at the electronic mall is registered. More specifically, in the product information DB 12*b*, product attributes such as a product ID, a store ID, a product code, genre information, a product name, a URL (Uniform Resource Locator) of a product image, product description and a product price are associated and registered per product sold by each store. The product ID is product identification information for managing a product to sell. The store ID is identification information of a store which is a distribution source of a product. The product code is a code number for identifying a product. The product code is, for example, a JAN (Japanese Article Number Code) code. The genre information indicates a genre to which a product belongs. The product name included in product information is displayed as the product name 110 in the appropriate product information 100-*i*. The product price included in the product information is displayed as the price 150 in the appropriate product information 100-*i*.

FIG. 8C is a view illustrating an example of content registered in the search result information DB 12*c*. In the search result information DB 12*c*, search result information related to a product search result is registered. More specifically, in the search result information DB 12*c*, a search date, a user ID, search conditions, a search product list and a final selection ranking are associated and registered every time a search is conducted. The search date is a date when a search is conducted. When, for example, a certain period of time passes from a search date, the search result information is deleted from the search result information DB 12*c*. The user ID indicates a user who requests for a search. As the search conditions, search conditions specified by the user are registered. The search product list is a list of searched products. More specifically, in the search product list, product IDs and display rankings of searched products are associated and registered per product. The final selection ranking is a display ranking of a product associated with the appropriate product information 100-*i* which is finally selected by the user.

Next, the other pieces of information stored in the memory unit 12 will be described. In the memory unit 12, various items of data such as HTML (HyperText Markup Language) document, XML (Extensible Markup Language) document, image data, text data and electronic document for displaying webpages are stored. Further, in the memory unit 12, various setting values set by, for example, an administrator are stored.

Furthermore, in the memory unit 12, various programs such as an operating system, a WWW (World Wide Web) server program, a DBMS (Database Management System) and an electronic commerce managing program are stored. The electronic commerce managing program is a program for executing various types of processing related to electronic commerce. The electronic commerce managing program is an example of an information processing program according to the present invention. In addition, the various programs may be, for example, acquired from another server apparatus through the network NW or may be recorded in a recording medium such as a DVD (Digital Versatile Disc) and read through a drive apparatus.

The input/output interface 13 performs interface processing between the communication unit 11 and the memory unit 12, and the system control unit 14.

The system control unit 14 is formed with, for example, a CPU (Central Processing Unit) 14*a*, a ROM (Read Only Memory) 14*b* and a RAM (Random Access Memory) 14*c*. Further, when the CPU 14*a* reads and executes the various programs, the system control unit 14 functions as a specifying means, a comparing means, a control means and an extracting means according to the present invention.

In addition, the electronic mall server 1 may be configured by a plurality of server apparatuses. For example, a server apparatus which performs processing related to searches for products, a server apparatus which performs processing such as an order of products, a server apparatus which transmits webpages according to requests from the user terminals 3 and a server apparatus which manages a database may be connected to each other through, for example, a LAN.

[4. Operation of Information Providing System]

Next, an operation of the information processing system S will be described using FIGS. 9 to 13. In addition, processing corresponding to user's selection of the product name 110 or the image 120 of the appropriate product information 100-*i* in a search result page will be described. Processing corresponding to user's selection of the checkbox 140 will be supplemented below.

Figure 9A:
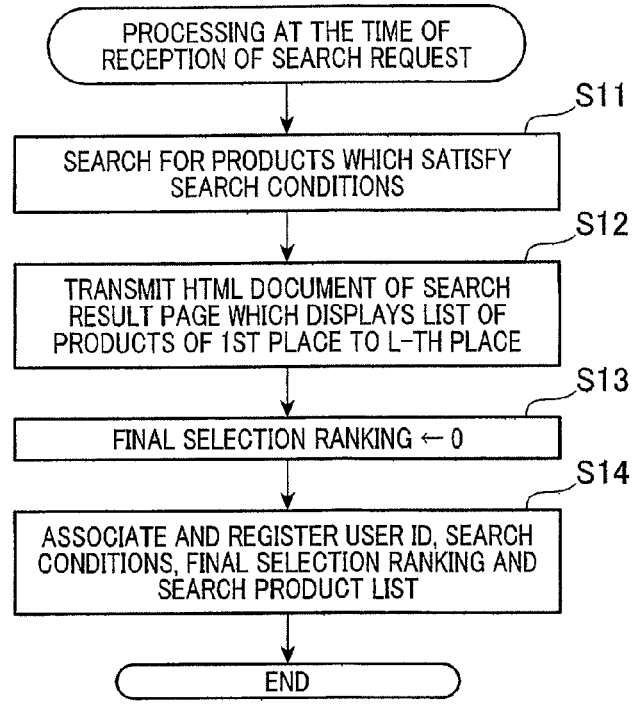
FIG. 9A is a flowchart illustrating a processing example in processing at the time of reception of a search request in a system control unit 14 of the electronic mall server 1 according to an embodiment.

FIG. 9A is a flowchart illustrating a processing example in processing upon reception of a search request in the system control unit 14 of the electronic mall server 1 according to the present embodiment. The user operates the user terminal 3, and specifies search conditions for searching for a product. Then, the user terminal 3 sends a search request to the electronic mall server 1. The search request includes a user ID of a user who specifies search conditions and the specified search conditions. The processing upon reception of a search request is started when the electronic mall server 1 receives the search request.

As illustrated in FIG. 9A, the system control unit 14 searches for products which satisfy the search conditions included in the received search request, based on product information registered in the product information DB 12*b* (step S11). Further, the system control unit 14 generates a search product list including product IDs and display rankings of the searched products.

Next, the system control unit 14 generates HTML document of a search result page which displays the appropriate product information 100-*i* about products the display rankings of which are the first place to the L place. In this case, the system control unit 14 generates the HTML document including a script. This script is a script of terminal side highlighted product control processing of monitoring whether or not there are highlighted products specified based on the products selected by the user. The details of the terminal side highlighted product control processing will be described below. The system control unit 14 sends the generated HTML document to the user terminal 3 which is a transmission source of the search request (step S12). The user terminal 3 which receives the HTML document displays the search result page based on the HTML document as illustrated in, for example, FIGS. 2 and 5.

Next, the system control unit 14 sets 0 to the final selection ranking (step S13). Next, the system control unit 14 associates and registers a search date, a user ID, search conditions, a final selection ranking and a search product list in the search result information DB 12*c* (step S14). When finishing processing in step S14, the system control unit 14 finishes processing upon reception of the search request.

Figure 9B:
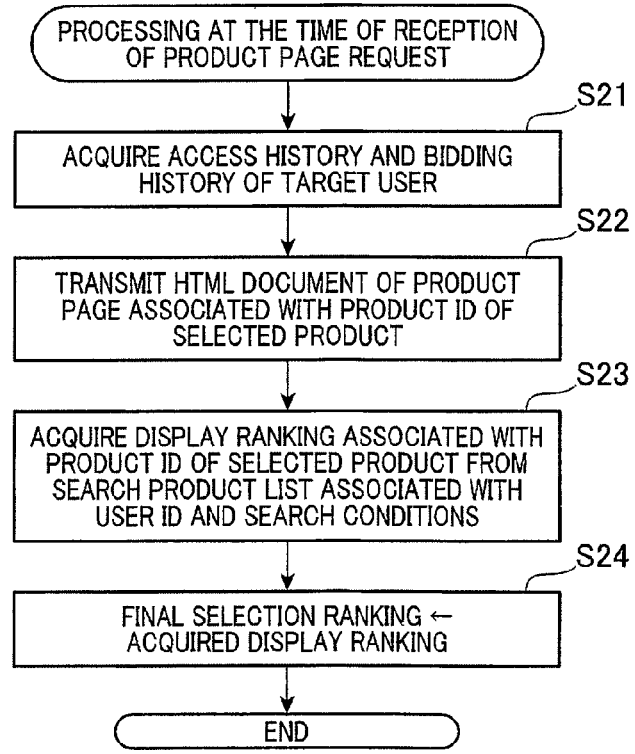
FIG. 9B is a flowchart illustrating a processing example in processing at the time of reception of a product page request in the system control unit 14 of the electronic mall server 1 according to an embodiment.

FIG. 9B is a flowchart illustrating a processing example in processing upon reception of a product page request in the system control unit 14 of the electronic mall server 1 according to the present embodiment. In a search result page displayed on the screen of the user terminal 3, the user selects the product name 110 or the image 120 of one of the appropriate product information 100-*i*. Then, the user terminal 3 sends a product page request to the electronic mall server 1. The product page request includes the user ID of the user who made selection, a product ID of a selected product associated with the selected product name 110 or image 120, and the search conditions specified upon transmission of the search request. The processing upon reception of a product page request is started when the electronic mall server 1 receives a product page request.

As illustrated in FIG. 9B, the system control unit 14 acquires the user ID, the product ID of the selected product and the search conditions from the product page request (step S21). Next, the system control unit 14 sends HTML document of the product page associated with the product ID of the selected product, to the user terminal 3 which is a transmission source of the product page request (step S22). The user terminal 3 which receives the HTML document displays a product page based on the HTML document.

Next, the system control unit 14 searches for search result information including the acquired user ID and search conditions from the search result information DB 12*c*. Further, the system control unit 14 acquires a display ranking associated with the product ID of the selected product from the search product list included in the searched search result information (step S23). Next, the system control unit 14 sets the display ranking associated with the product ID of the selected product to the final selection ranking included in the searched search information (step S24). Thus, the system control unit 14 as the specifying means specifies the selected product. When finishing this processing, the system control unit 14 finishes processing upon reception of a product page request.

FIG. 10A is a flowchart illustrating a processing example in terminal side highlighted product control processing of the user terminal 3 according to the present embodiment. The user terminal 3 which receives HTML document of a search result page executes terminal side highlighted product control processing based on a script described in this HTML document. The terminal side highlighted product control processing and the server side highlighted product control processing described below are processing for displaying the appropriate product information 100-*i* associated with an advantageous product in a display mode which is easily visually checked in a search result page displayed when the previous page return button is selected while a product page is displayed.

As illustrated in FIG. 10A, the user terminal 3 sends a control request to the electronic mall server 1 (step S31). The control request includes a user ID of the user of the user terminal 3, the search conditions specified upon transmission of the search request and a page number of a currently displayed search result page.

FIG. 10B is a flowchart illustrating a processing example in server side highlighted product control processing of the system control unit 14 of the electronic mall server 1 according to the present embodiment. The server side highlighted product control processing is processing of monitoring reception of a control request from the user terminal 3, and performing control according to the control request such that the display mode of the appropriate product information 100-*i* associated with an advantageous product changes to a display mode which is easily visually checked.

As illustrated in FIG. 10B, the system control unit 14 decides whether the control request is received from the user terminal 3 (step S41). In this case, when deciding that the control request is not received (step S41: NO), the system control unit 14 proceeds to S41. Meanwhile, when deciding that the control request is received (step S41: YES), the system control unit 14 acquires the user ID, the search conditions and the page number from the control request (step S42). Next, the system control unit 14 searches for search result information including the acquired user ID and search conditions from the search result information DB 12*c*. Further, the system control unit 14 acquires the search product list and the final selection ranking included in the searched search result information (step S43).

Next, the system control unit 14 decides whether or not the acquired final selection ranking is 0 (step S44). In this case, when deciding that the final selection ranking is 0 (step S44: YES), the system control unit 14 proceeds to step S41. Meanwhile, when deciding that the final selection ranking is not 0 (step S44: NO), the system control unit 14 calculates a top display ranking and a bottom display ranking according to the following equation (step S45).

Top display ranking=(page number−1)×L+1

Bottom display ranking=top display ranking+L−1

The top display ranking is a display ranking of a product of the highest display ranking among products associated with the appropriate product information 100-$i$ displayed in the search result page. The bottom display ranking is a display ranking of a product of the lowest display ranking among the products associated with the appropriate product information 100-$i$ displayed in the search result page. Next, the system control unit 14 executes highlighted product specifying processing (step S46).

Figure 11:
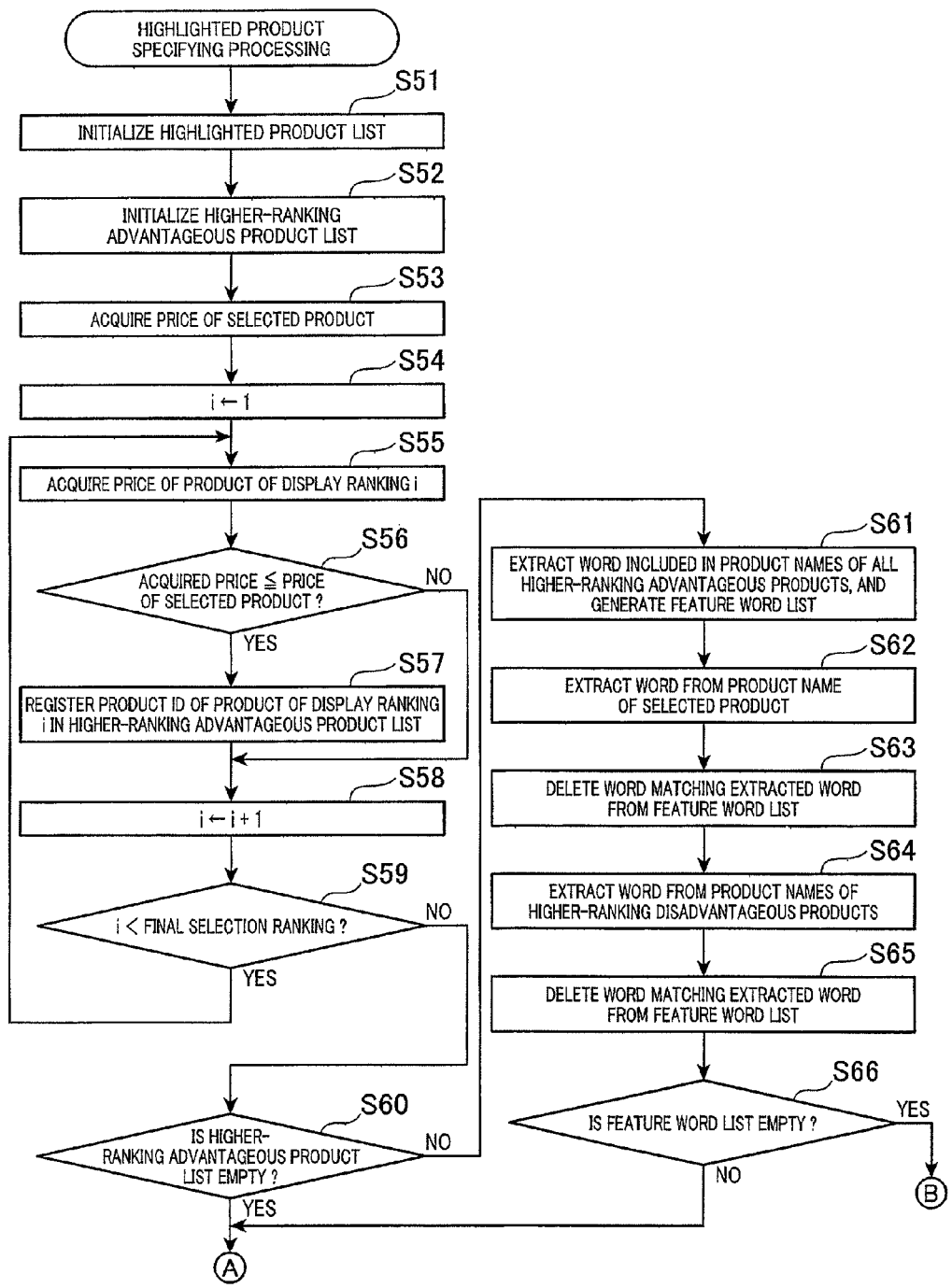
FIG. 11 is a flowchart illustrating a processing example in highlighted product specifying processing of the system control unit 14 of the electronic mall server 1 according to an embodiment.
Figure 12:
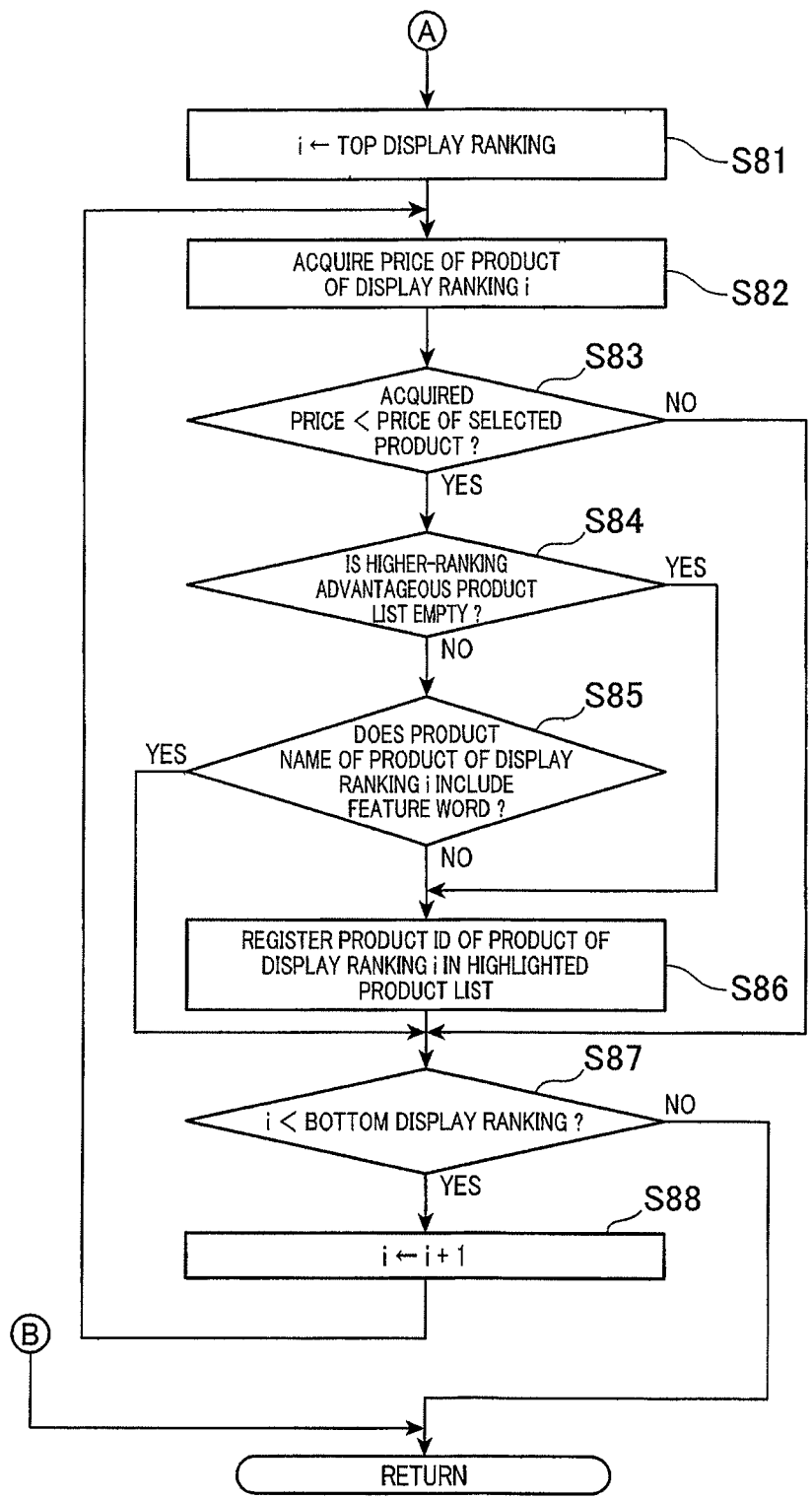
FIG. 12 is a flowchart illustrating a processing example in highlighted product specifying processing of the system control unit 14 of the electronic mall server 1 according to an embodiment.

FIGS. 11 and 12 are flowcharts illustrating processing examples in highlighted product specifying processing of the system control unit 14 of the electronic mall server 1 according to the present embodiment.

As illustrated in FIG. 11, the system control unit 14 initializes a highlighted product list (step S51). In the highlighted product list, product IDs of products associated with the appropriate product information 100-$i$ the display modes of which are changed to display modes which are easily visually checked are registered. Next, the system control unit 14 initializes a higher-ranking advantageous product list (step S52). In the higher-ranking advantageous product list, product IDs of higher-ranking advantageous products are registered. Next, the system control unit 14 acquires a price of the selected product from product information of the selected product (step S53). Next, the system control unit 14 sets 1 to the display ranking i (step S54).

Next, the system control unit 14 acquires a product ID of a product associated with the display ranking i from the search product list. Further, the system control unit 14 acquires the price of the product of the display ranking i from the product information associated with the acquired product ID (step S55). Next, the system control unit 14 as the comparing means compares the price of the product of the display ranking i and the price of the selected product. Further, the system control unit 14 decides whether or not the price of the product of the display ranking i is the price of the selected product or less (step S56). In addition, a deciding method in step S56 is a method of deciding to include higher-ranking products the attributes values of which are the same as that of the selected product, in higher-ranking advantageous products. In this case, when deciding that the price of the product of the display ranking i is the price of the selected product or less (step S56: YES), the system control unit 14 registers the product ID of the product of the display ranking i in the higher-ranking advantageous product list (step S57).

When finishing processing in step S57 or deciding in step S56 that the price of the product of the display ranking i is higher than the price of the selected product (step S56: NO), the system control unit 14 adds 1 to the display ranking i (step S58). Next, the system control unit 14 decides whether or not a value of the display ranking i is smaller than a value of the final selection ranking (step S59). In this case, when deciding that the value of the display ranking i is smaller than the value of the final selection ranking (step S59: YES), the system control unit 14 proceeds to step S55. The system control unit 14 extracts higher-ranking advantageous products from higher-ranking products by repeating steps S55 to S59.

When deciding that the value of the display ranking i is not smaller than the value of the final selection ranking (step S59: NO), the system control unit 14 decides whether or not the higher-ranking advantageous product list is empty (step S60). That is, the system control unit 14 decides whether even one product ID is not registered in the higher-ranking advantageous product list. In this case, when deciding that the higher-ranking advantageous product list is empty (step S60: YES), the system control unit 14 proceeds to step S81.

Meanwhile, when deciding that the higher-ranking advantageous product list is not empty (step S60: NO), the system control unit 14 acquires a product name of each higher-ranking advantageous product from product information associated with the product ID registered in the higher-ranking advantageous product list. Next, the system control unit 14 extracts words included in all higher-ranking advantageous products. Further, the system control unit 14 generates a feature word list including the extracted words (step S61).

Next, the system control unit 14 extracts words included in the product name of the selected product (step S62). Next, the system control unit 14 deletes the same words as the words included in the product name of the selected product from the words registered in the feature word list (step S63).

Next, the system control unit 14 extracts words included in product names of higher-ranking disadvantageous products per higher-ranking disadvantageous product (step S64). Next, the system control unit 14 deletes the same words as the words included in the product names of the higher-ranking disadvantageous products from the words registered in the feature word list (step S65). The words registered in the feature word list at a point of time when this processing is finished are feature words. Thus, the system control unit 14 as the extracting means extracts feature words.

Next, the system control unit 14 decides whether or not the feature word list is empty (step S66). That is, the system control unit 14 decides whether even one word is not registered in the feature word list. In this case, when deciding that the feature word list is empty (step S66: YES), the system control unit 14 finishes the highlighted product specifying processing. In this case, the highlighted product list is empty. That is, there is not even one appropriate product information 100-$i$ which is displayed in a display mode which is easily visually checked. When a feature word is not extracted from the product names of the higher-ranking advantageous products, the system control unit 14 cannot decide that the user selects the appropriate product information 100-$i$ of the selected product by putting heavy weight on the price.

Meanwhile, when deciding that the feature word list is not empty (step S66: NO), the system control unit 14 proceeds to step S81.

As illustrated in FIG. 12, in step S81, the system control unit 14 sets the top display ranking to the display ranking i. Next, the system control unit 14 acquires the price of the product of the display ranking i according to the same method as in that in step S55 (step S82). Next, the system control unit 14 decides whether or not the price of the product of the display ranking i is cheaper than the price of the selected product (step S83). In this case, when deciding that the price of the product of the display ranking i is cheaper than the price of the selected product (step S83: YES), the system control unit 14 decides whether or not the higher-ranking advantageous product list is empty (step S84). In this case, when deciding that the higher-ranking advantageous product list is not empty (step S84: NO), the system control unit 14 decides whether or not the product name of the product of the display ranking i includes a feature word registered in the feature word list (step S85).

When deciding in step S84 that the higher-ranking advantageous product list is empty (step S84: YES) or deciding in step S85 that the product name of the product of the display ranking i does not include even one feature word (step S85: NO), the system control unit 14 registers the product ID of the product of the display ranking i in the highlighted product list (step S86). That is, the system control unit 14 specifies the product of the display ranking i as a product the appropriate product information 100-i of which is easily visually checked.

When deciding in step S83 that the price of the product of the display ranking i is not cheaper than the price of the selected product (step S83: NO), deciding in step S85 that the product name of the product of the display ranking i includes at least one feature word (step S85: YES) or finishing processing in step S86, the system control unit 14 decides whether or not the value of the display ranking i is smaller than the value of the bottom display ranking (step S87). In this case, when deciding that the value of the display ranking i is smaller than the value of the bottom display ranking (step S87: YES), the system control unit 14 adds 1 to the display ranking i (step S88). Next, the system control unit 14 proceeds to step S82. By repeating steps S82 to S88, the system control unit 14 specifies a product associated with each appropriate product information 100-i displayed in the search result page as a product associated with the appropriate product information 100-i the display mode of which is changed to a display mode which is easily visually checked. Further, when a feature word is extracted from the product names of the higher-ranking advantageous products and product names of advantageous products do not include the feature word, the system control unit 14 specifies the advantageous products as products associated with the appropriate product information 100-i the display modes of which are changed to display modes which are easily visually checked. When deciding in step S87 that the value of the display ranking i is not smaller than the value of the bottom display ranking (step S87: NO), the system control unit 14 finishes the highlighted product specifying processing.

When finishing the highlighted product specifying processing, the system control unit 14 decides whether or not the highlighted product list is empty as illustrated in FIG. 10A (step S47). In this case, when deciding that the highlighted product list is empty (step S47: YES), the system control unit 14 sends a control response message which does not include a highlighted product list, to the user terminal 3 which is transmission source of the control request (step S49). Meanwhile, when deciding that the highlighted product list is not empty (step S47: NO), the system control unit 14 includes the highlighted product list in the control response message (step S48). Next, the system control unit 14 sends the control response message including the highlighted product list, to the user terminal 3 which is the transmission source of the control request (step S49). By executing processing in steps S48 and 49, the system control unit 14 as the control means performs control such that the display modes of the appropriate product information 100-i associated with advantageous products change to display modes which are more easily visually checked than the display modes of the appropriate product information 100-i associated with disadvantageous products. When finishing processing in step S49, the system control unit 14 proceeds to step S41.

As illustrated in FIG. 10A, when receiving the control response message from the electronic mall server 1 (step S32), the user terminal 3 decides whether or not the control response message includes the highlighted product list (step S33). In this case, when deciding that the highlighted product list is not included (step S33: NO), the user terminal 3 stands by for a certain period of time (step S38). Next, the system control unit 14 proceeds to step S31. A stand-by time of the user terminal 3 in step S38 is set in advance. For example, the stand-by time may be set to, for example, five seconds.

Meanwhile, when deciding that the highlighted product list is included (step S33: YES), the user terminal 3 acquires one product ID from the highlighted product list (step S34). Next, the user terminal 3 changes the display mode of the appropriate product information 100-i associated with the acquired product ID to a display mode which is more easily visually checked than those of the other pieces of the appropriate product information 100-i (step S35). Next, the user terminal 3 decides whether or not there is a product ID which is not yet acquired from the highlighted product list (step S36). In this case, when deciding that there is the product ID which is not yet acquired (step S36: YES), the user terminal 3 acquires one of product IDs which are not yet acquired (step S37). Next, the user terminal 3 proceeds to step S35. Meanwhile, when deciding that all product IDs are acquired (step S36: NO), the user terminal 3 proceeds to step S38.

By sending the control request on a regular basis in the terminal side highlighted product control processing, the user terminal 3 receives the control response message from the electronic mall server 1. Further, the user terminal 3 changes display modes of the appropriate product information 100-i associated with advantageous products to display modes which are easily visually checked, based on the highlighted product list included in the control response message. When the previous page return button is selected while a product page is displayed according to these types of processing, the screen of the user terminal 3 displays a search result page as illustrated in, for example, FIGS. 3 and 6.

Figure 13:
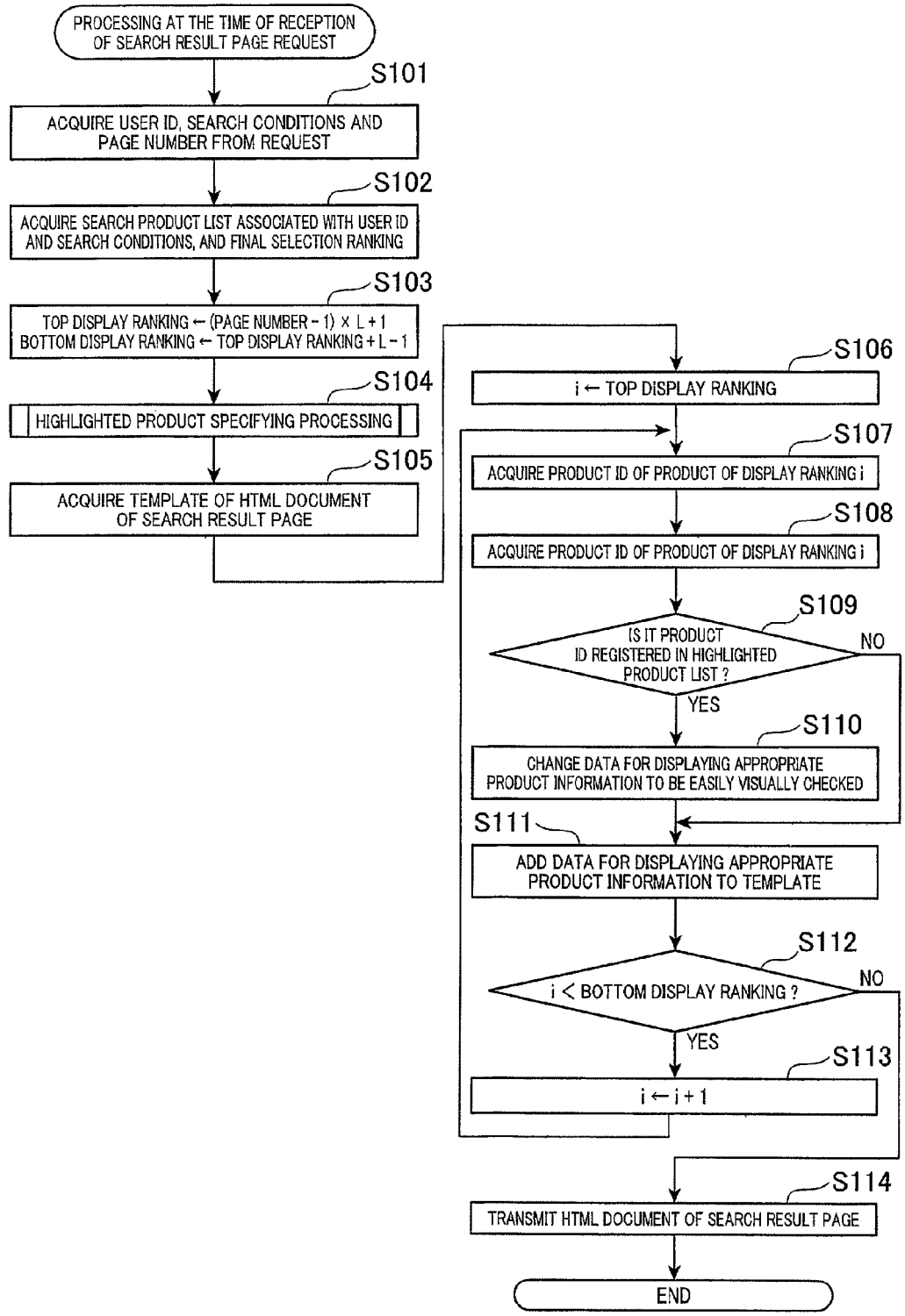
FIG. 13 is a flowchart illustrating a processing example in processing at the time of reception of a search result page request in the system control unit 14 of the electronic mall server 1 according to an embodiment.

FIG. 13 is a flowchart illustrating a processing example in processing upon reception of a search result page request in the system control unit 14 of the electronic mall server 1 according to the present embodiment. In the search page displayed on the screen of the user terminal 3, the user selects the next page link 210 or the previous page link 220. Then, the user terminal 3 sends a search result page request to the electronic mall server 1. The search result page request includes a user ID of a user who made selection, search conditions specified upon transmission of the search request, and a page number of a search result page which is displayed next when the next page link 210 or the previous page link 220 is selected. The processing upon reception of a search result page request is started when the electronic mall server 1 receives a search result page request.

As illustrated in FIG. 13, the system control unit 14 acquires the user ID, the search conditions and the page number from the search result page request (step S101). Next, the system control unit 14 acquires the search product list and the final selection ranking included in the search result information including the acquired user ID and search conditions (step S102). Next, the system control unit 14 calculates the top display ranking and the bottom display ranking according to the same method as that in step S45 in the server side highlighted product control processing (step S103). Next, the system control unit 14 executes the highlighted product specifying processing (step S104).

When finishing the highlighted product specifying processing, the system control unit 14 generates HTML document of the search result page. First, the system control unit 14 acquires a template of the HTML document of the search result page from the memory unit 12 (step S105). Next, the system control unit 14 sets the top display ranking to the display ranking i (step S106). Next, the system control unit 14 acquires the product ID of the product of the display ranking i from the search product list (step S107). Next, the system control unit 14 generates data for displaying the appropriate product information 100-i, based on the product information about the product of the display ranking i (step S108).

Next, the system control unit 14 decides whether or not the product ID of the product of the display ranking i is registered in the highlighted product list (step S109). In this case, when deciding that the product ID of the product of the display ranking i is registered in the highlighted product list (step S109: YES), the system control unit 14 as the control means changes a definition portion of a display mode in the generated data such that the display mode of the appropriate product information 100-i changes to the display mode which is easily visually checked (step S110).

When deciding in step S109 that the product ID of the product of the display ranking i is not registered in the highlighted product list (step S109: NO) or when finishing processing in step S110, the system control unit 14 adds to the template the data for displaying the appropriate product information 100-i (step S111).

Next, the system control unit 14 decides whether or not the value of the display ranking i is smaller than the value of the bottom display ranking (step S112). In this case, when deciding that the value of the display ranking i is smaller than the value of the bottom display ranking (step S112: YES), the system control unit 14 adds 1 to the display ranking i (step S113). Next, the system control unit 14 proceeds to step S107. The system control unit 14 generates the HTML document of the search result page including the appropriate product information 100-i by repeating steps S107 to S113.

When deciding in step S112 that the value of the display ranking i is not smaller than the value of the bottom display ranking (step S112: NO), the system control unit 14 sends the generated HTML document to the user terminal 3 which is the transmission source of the search result page request (step S114). When finishing this processing, the system control unit 14 finishes the processing upon reception of the search result page request. The user terminal 3 which receives the HTML document displays the search result page based on the HTML document as illustrated in, for example, FIG. 4.

Next, an outline of the processing corresponding to user's selection of the checkbox 140 will be described.

When the user selects the checkbox 140 of one appropriate product information 100-i in the search result page displayed on the screen of the user terminal 3, the user terminal 3 sends a comparison product selection notice to the electronic mall server 1. The comparison product selection notice includes a user ID of the user who selects the checkbox 140, a product ID of the selected product associated with the appropriate product information 100-i including the selected checkbox 140, search conditions specified upon transmission of a search request and a page number of a currently displayed search result page. The system control unit 14 acquires the user ID, the product ID, the search conditions and the page number from the comparison product selection notice. Next, the system control unit 14 acquires a display ranking of a selected product based on a search product list included in search result information associated with the user ID and the search conditions. Next, the system control unit 14 sets the display ranking of the selected product to the final selection ranking included in the search result information. Next, by performing the same processing as the processing in steps S45 to S49 after executing the same processing as the processing in step S43 in the server side highlighted product control processing illustrated in FIG. 10B, the system control unit 14 sends a control response message to the user terminal 3. Processing content in case that the user terminal 3 receives the control response message is the same as the processing in steps S33 to S37 in the terminal side highlighted product control processing illustrated in FIG. 10A.

As described above, according to the present embodiment, the system control unit 14 specifies the appropriate product information 100-i selected by the user from a plurality of appropriate product information 100-i displayed as a search result according to an order matching display rankings associated with searched products, compares an attribute value of a selected product and attribute values of higher-ranking products associated with display rankings which are higher than the display ranking of the selected product associated with the specified appropriate product information 100-i, and, when the attribute value of the selected product is more advantageous for the user, performs control such that the appropriate product information 100-i about advantageous products attribute values of which are more advantageous for the user than that of the selected product changes to display modes which are more easily visually checked than those of the appropriate product information 100-i about disadvantageous products attribute values of which are more disadvantageous for the user than that of the selected product. Consequently, it is possible to easily find the appropriate product information 100-i about a product which the user is likely to desire.

Further, the system control unit 14 may extract a feature word which is not included in a character string related to the selected product, from character strings related to higher-ranking advantageous products when there are the higher-ranking advantageous products among higher-ranking products the attribute values of which are more advantageous than that of the selected product, and, when the feature word is extracted, perform control such that the appropriate product information 100-i about advantageous products the character strings of which do not include the feature word changes to display modes which are more easily visually checked than those of the appropriate product information 100-i about the disadvantageous products and the advantageous products the character strings of which include the feature word. By this means, even if products have the attribute values which satisfy conditions which the user desires, the appropriate product information 100-i about products which the user is likely not to desire is not easily visually checked, so that it is possible to easily find the appropriate product information 100-i about products which the user is likely to desire.

Further, the system control unit 14 may extract from the character strings related to the higher-ranking advantageous products a feature word which is included neither in character strings related to products among the higher-ranking products the attribute values of which are more disadvantageous than that of the selected product nor the character strings related to the selected product. By this means, it is possible to extract a word related to a factor which, even though the higher-ranking advantageous products do not include inconvenient information for the user, can give attribute values which are advantageous for the user, to the higher-ranking advantageous products.

In addition, in the above embodiment, the present invention is applied to search for products as search targets. However, the present invention may be applied to search for, for example, service, facilities, locations, webpages, images, movies, audios, maps, news and blogs.

Further, in the above embodiment, the information processing apparatus changes a display mode of information about a third search target an attribute value of which is more disadvantageous than that of a first search target associated with information selected by the user to perform control such that information about the third search target changes to a display mode which is more easily visually checked than that of information about a fourth search target an attribute value of which is more disadvantageous than that of the first search target. However, the information processing apparatus may change the display mode of the information about the fourth search target such that the information about the third search target changes to a display mode which is more easily visually checked than that of the information about the fourth search target.

REFERENCE SIGNS LIST

1 ELECTRONIC MALL SERVER
2 STORE TERMINAL
3 USER TERMINAL
11 COMMUNICATION UNIT
12 MEMORY UNIT
12a MEMBER INFORMATION DB
12b PRODUCT INFORMATION DB
12c SEARCH RESULT INFORMATION DB
13 INPUT/OUTPUT INTERFACE
14 SYSTEM CONTROL UNIT
14a CPU
14b ROM
14c RAM
15 SYSTEM BUS
NW NETWORK
S INFORMATION PROVIDING SYSTEM

The invention claimed is:

1. An information processing device comprising:
at least one processor operable to read and operate according to instructions within a computer program; and
at least one memory operable to store at least portions of said computer program for access by said processor;
wherein said program includes algorithms to cause said processor to implement:
a specifying unit that specifies information of a search target selected by a user, from a plurality of pieces of information about search targets which are displayed as a search result according to an order matching a display ranking associated with the searched search targets, and which include attribute values of the search targets;
a comparing unit that, when a search target is selected according to a user input and remaining search targets are not selected according to the same user input, compares the attribute value of the selected search target with the attribute value of a non-selected search target, among the remaining search targets, when a condition that the display ranking of the non-selected search target in the search result is higher than the display ranking of the selected search target is met, wherein each of the attribute values of the selected search target and the non-selected search target is a value of an attribute item set in advance; and
a control unit that, when the attribute value of the selected search target is more advantageous for the user than the attribute value of the non-selected search target as a result of the comparison by the comparing unit, performs control such that information about a search target, among the remaining search targets, whose attribute value is more advantageous than that of the selected search target changes to a display mode, the display mode being more visually distinguishable from information about a search target, among the remaining search targets, whose attribute value is more disadvantageous than that of the selected search target, wherein according to a type of the attribute item set in advance, it is predetermined whether a lower or higher attribute value is advantageous to the user, and
the higher attribute value is disadvantageous when it is predetermined that the lower attribute value is advantageous and the lower attribute value is disadvantageous when it is predetermined that the higher attribute value is advantageous.

2. The information processing apparatus according to claim 1,
wherein the information comprises the attribute values, and character strings related to the search targets;
said program further includes algorithms to cause said processor to further implement an extracting unit that, when as a result of the comparison made by the comparing unit, the non-selected search target includes an attribute value which is more advantageous than that of the selected search target, extracts a word which is not included in the character string related to the selected search target from the character string related to the non-selected search target; and
when the extracting unit extracts the word, the control unit perform controls such that information about a search target, among the remaining search targets, whose attribute value is more advantageous than that of the selected search target and whose character string does not include the word changes to a display mode, the display mode being more visually distinguishable from information about a search target whose character string includes the word.

3. The information processing apparatus according to claim 2,
wherein the extracting unit extracts, from the character string related to the non-selected search target, a word which is included neither in a character string related to another non-selected search target, among the remaining search targets, whose attribute value is more disadvantageous than that of the selected search target nor in the character string related to the selected search target.

4. The information processing apparatus according to claim 1,
wherein, when the selected search target and the non-selected search target comprises a plurality of attribute values, respectively, the comparing unit compares the attribute value of the selected search target with the attribute values of the non-selected search target for each of the plurality of attribute values to determine the attribute value of the selected search target which is more advantageous for the user than that of the non-selected search target, and
the control unit performs the control when the determined attribute value of a search target, among the remaining search targets, is more advantageous for the user than the determined attribute value of the selected search target.

5. An information processing method executed by an information processing apparatus comprising:
a specifying step of specifying information of a search target selected by a user, from a plurality of pieces of information about search targets which are displayed as a search result according to an order matching a display ranking associated with the searched search targets, and which include attribute values of the search targets;
a comparing step of comparing, when a search target is selected according to a user input and remaining search targets are not selected according to the same user input, the attribute value of the selected search target with the attribute value of a non-selected search target, among the remaining search targets, when a condition that the display ranking of the non-selected search target in the search result is higher than the display ranking of the selected search target is met, wherein each of the attribute values of the selected search target and the non-selected search target is a value of an attribute item set in advance; and a control step of, when the attribute value of the selected search target is more advantageous for the user than the attribute value of the non-selected search target as a result of the comparison in the comparing step, performing control such that information about a search target, among the remaining search targets, whose attribute value is more advantageous than that of the selected search target changes to a display mode, the display mode being visually distinguishable from information about a search target, among the remaining search targets, whose attribute value is more disadvantageous than that of the selected search target, wherein according to a type of the attribute item set in advance, it is predetermined whether a lower or higher attribute value is advantageous to the user, and the higher attribute value is disadvantageous when it is predetermined that the lower attribute value is advantageous and the lower attribute value is disadvantageous when it is predetermined that the higher attribute value is advantageous.

6. The information processing method according to claim 5, wherein, when the selected search target and the non-selected search target comprises a plurality of attribute values, respectively, the comparing unit compares the attribute value of the selected search target with the attribute values of the non-selected search target for each of the plurality of attribute values to determine the attribute value of the selected search target which is more advantageous for the user than that of the non-selected search target, and the control unit performs the control when the determined attribute value of a search target, among the remaining search targets, is more advantageous for the user than the determined attribute value of the selected search target.

7. A non-transitory recording medium having a computer-readable information processing program recorded thereon that causes a computer included in an information processing apparatus:

wherein said computer comprises at least one processor operable to read and operate according to instructions within said computer-readable information processing program, and at least one memory operable to store at least portions of said computer-readable information processing program for access by said processor, and wherein said computer-readable information processing program includes algorithms to cause said processor to implement:

a specifying unit that specifies information of a search target selected by a user, from a plurality of pieces of information about search targets which are displayed as a search result according to an order matching a display ranking associated with the searched search targets, and which include attribute values of the search targets;

a comparing unit that, when a search target is selected according to a user input and remaining search targets are not selected according to the same user input, compares the attribute value of the selected search target with the attribute value of a non-selected search target, among the remaining search targets, when a condition that the display ranking of the non-selected search target in the search result is higher than the display ranking of the selected search target is met, wherein each of the attribute values of the selected search target and the non-selected search target is a value of an attribute item set in advance; and a control unit that, when the attribute value of the selected search target is more advantageous for the user than the attribute value of the non-selected search target as a result of the comparison by the comparing unit, performs control such that information about a search target, among the remaining search targets, whose attribute value is more advantageous than that of the selected search target changes to a display mode, the display mode being visually distinguishable from information about a search target, among the remaining search targets, whose attribute value is disadvantageous than that of the selected search target, wherein according to a type of the attribute item set in advance, it is predetermined whether a lower or higher attribute value is advantageous to the user, and the higher attribute value is disadvantageous when it is predetermined that the lower attribute value is advantageous and the lower attribute value is disadvantageous when it is predetermined that the higher attribute value is advantageous.

8. The non-transitory recording medium according to claim 7, wherein, when the selected search target and the non-selected search target comprises a plurality of attribute values, respectively, the comparing unit compares the attribute value of the selected search target with the attribute values of the non-selected search target for each of the plurality of attribute values to determine the attribute value of the selected search target which is more advantageous for the user than that of the non-selected search target, and the control unit performs the control when the determined attribute value of a search target, among the remaining search targets, is more advantageous for the user than the determined attribute value of the selected search target.

* * * * *